(12) United States Patent
Deguchi et al.

(10) Patent No.: US 10,111,236 B2
(45) Date of Patent: Oct. 23, 2018

(54) WIRELESS COMMUNICATION APPARATUS AND WIRELESS COMMUNICATION METHOD

(75) Inventors: Noritaka Deguchi, Kanagawa (JP); Jun Mitsugi, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1253 days.

(21) Appl. No.: 13/245,407

(22) Filed: Sep. 26, 2011

(65) Prior Publication Data

US 2012/0014346 A1    Jan. 19, 2012

Related U.S. Application Data

(63) Continuation of application No. 11/723,880, filed on Mar. 22, 2007.

(30) Foreign Application Priority Data

Jun. 6, 2006    (JP) .............................. P2006-157516

(51) Int. Cl.
*H04W 72/08*    (2009.01)
*H04W 72/04*    (2009.01)

(52) U.S. Cl.
CPC ........ *H04W 72/085* (2013.01); *H04W 72/048* (2013.01)

(58) Field of Classification Search
CPC ... H04W 52/16; H04W 52/346; H04W 72/00; H04W 72/042; H04W 72/0453; H04W 72/12; H04W 72/048; H04W 72/1231; H04W 48/18; H04W 52/42; H04W 88/06; H04W 16/04; H04W 16/18; H04W 24/10; H04W 28/04; H04W 72/121; H04W 72/1268; H04W 16/00; H04W 56/0005; H04W 72/085; H04W 72/1263; H04W 88/085; H04L 27/0008; H04L 27/2636; (Continued)

(56) References Cited

U.S. PATENT DOCUMENTS 7,054,301 B1 * 5/2006 Sousa .................... H04B 1/715
                                                    370/343
2006/0023773 A1 * 2/2006 Nakayama .................... 375/146
(Continued)

FOREIGN PATENT DOCUMENTS

JP    05-110499 A    4/1993
JP    09-224275 A    8/1997
(Continued)

OTHER PUBLICATIONS

Japan Patent Office Action dated May 27, 2011.
Japan Patent Office Action dated Feb. 18, 2011.

*Primary Examiner* — George Eng
*Assistant Examiner* — Jing Gao
(74) *Attorney, Agent, or Firm* — Banner & Witcoff, Ltd.

(57) ABSTRACT

An aspect of the invention provides a wireless communication apparatus that includes a generator configured to generate modulated signals; a mapping unit configured to map the modulated signals on at least one subcarrier in a frequency domain, the subcarrier being in a first subcarrier group corresponding to one of a plurality of subcarrier groups, wherein frequencies of the subcarrier mapped by the mapping unit is predefined by a pattern with slot, each slot including symbols in a time domain, the predefined pattern of the frequencies of each slot depending on a base station; and a transmitter configured to transmit the modulated signals mapped by the mapping unit.

19 Claims, 21 Drawing Sheets

(58) Field of Classification Search
CPC .............. H04L 5/0037; H04L 1/0067; H04L 25/03159; H04L 5/003; H04L 5/0042; H04L 5/0058; H04L 5/0007; H04L 27/2614; H04L 5/0044; H04L 5/0094; H04L 1/0013; H04L 5/0023; H04L 5/0053; H04L 5/006; H04L 1/0003; H04L 1/0009; H04L 1/0071; H04L 25/061; H04L 27/183; H04L 27/2615; H04L 27/3488; H04L 5/0046; H04L 5/0062; H04L 5/0073; H04L 5/0091; H04L 5/023; H04L 5/026; H04L 27/261; H04L 1/06; H04L 25/20; H04L 27/2601; H04L 27/2608; H04L 27/2618; H04L 5/0032; H04L 1/0011; H04L 1/003; H04L 1/0668; H04L 1/1671; H04L 1/1692; H04B 7/0671; H04B 7/0689; H04B 1/7103; H04B 1/713; H04B 7/0478; H04B 7/0623; H04B 7/068; H04B 7/15542; H04B 1/707; H04B 7/0669; H04B 7/0891; H04J 13/0059

USPC .................. 370/328, 330, 343, 344, 347
See application file for complete search history.

(56) References Cited

U.S. PATENT DOCUMENTS

2006/0072678 A1* 4/2006 Hadad .................. H04L 5/06
                                                    375/260
2006/0135075 A1* 6/2006 Tee .................... H04L 5/0007
                                                   455/67.13
2006/0245390 A1* 11/2006 Omoto ............. H04L 27/2608
                                                    370/328
2007/0159993 A1* 7/2007 Classon et al. ............ 370/319

FOREIGN PATENT DOCUMENTS

| | | | | |
|---|---|---|---|---|
| JP | 2003-018091 A | | 1/2003 | |
| JP | 2004-236322 A | | 8/2004 | |
| JP | 2006-033480 A | | 2/2006 | |
| WO | WO 2005/089006 | * | 9/2005 | |
| WO | WO 2006102744 A1 | * | 10/2006 | .......... H04L 27/26 |

* cited by examiner

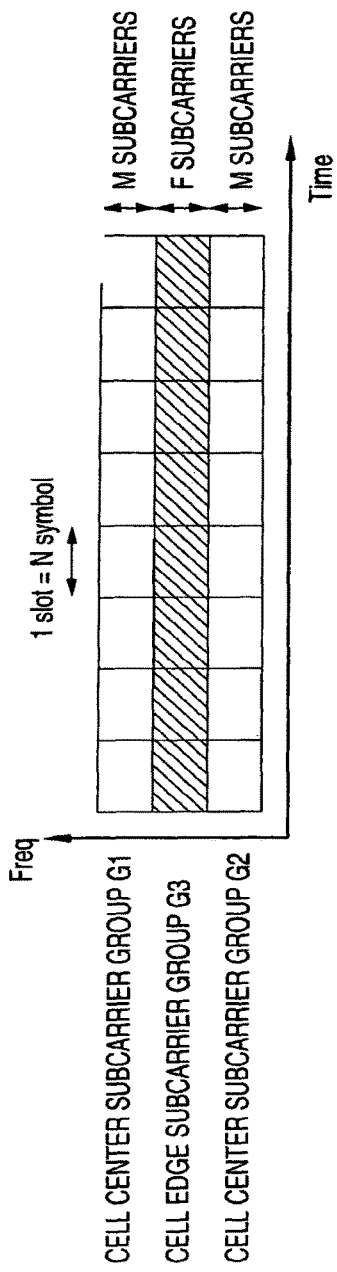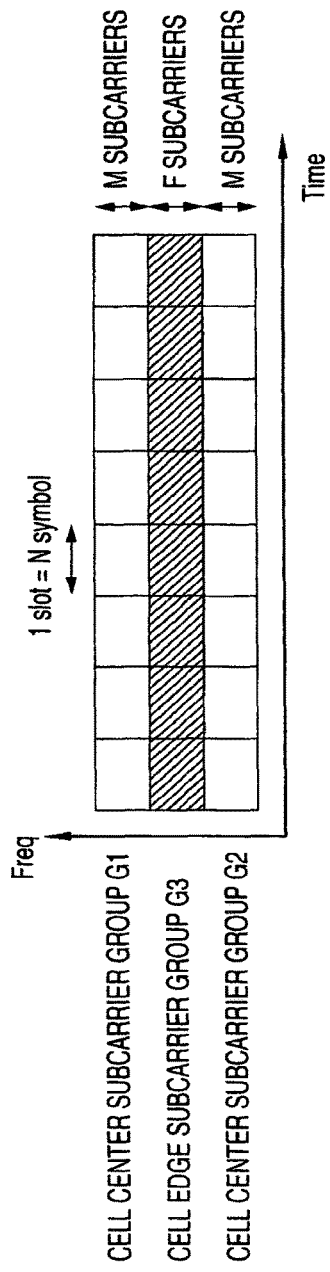

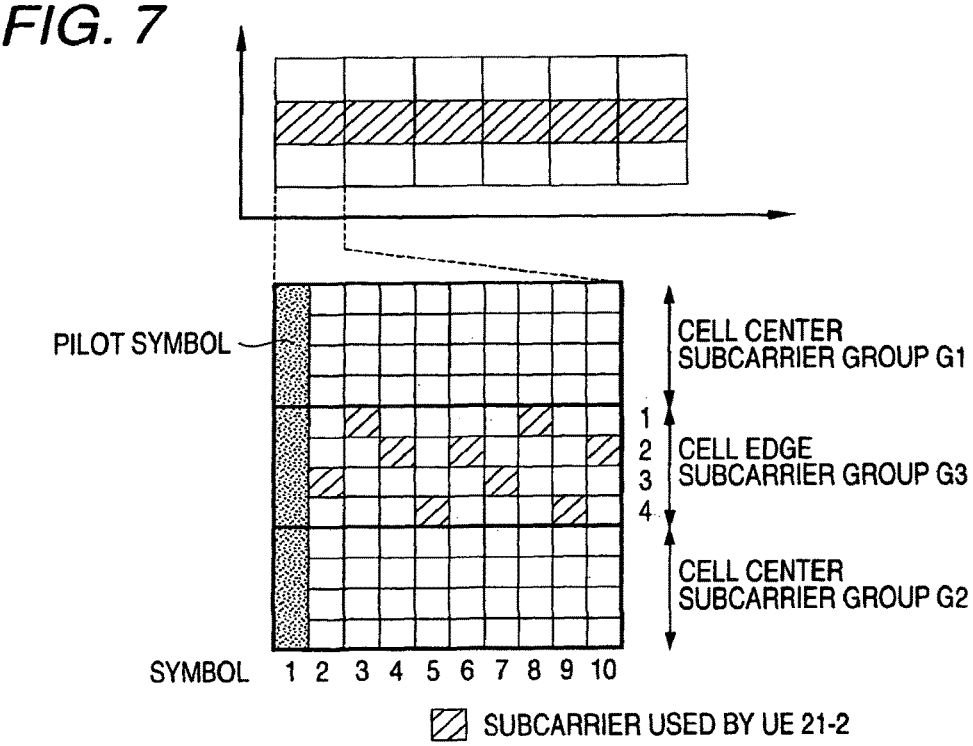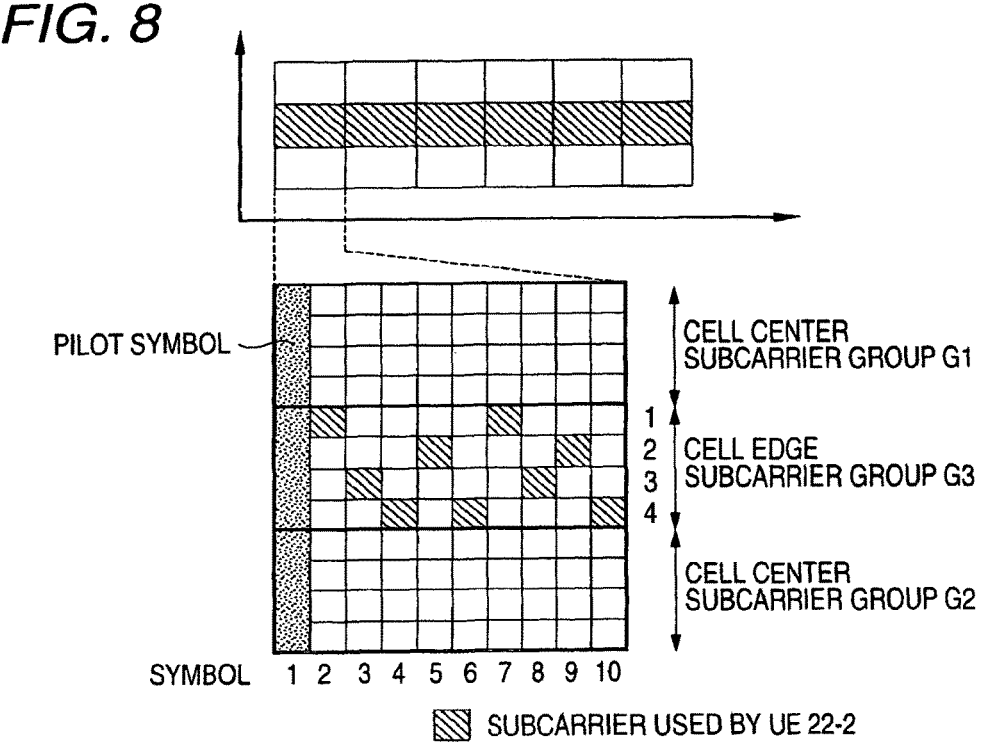

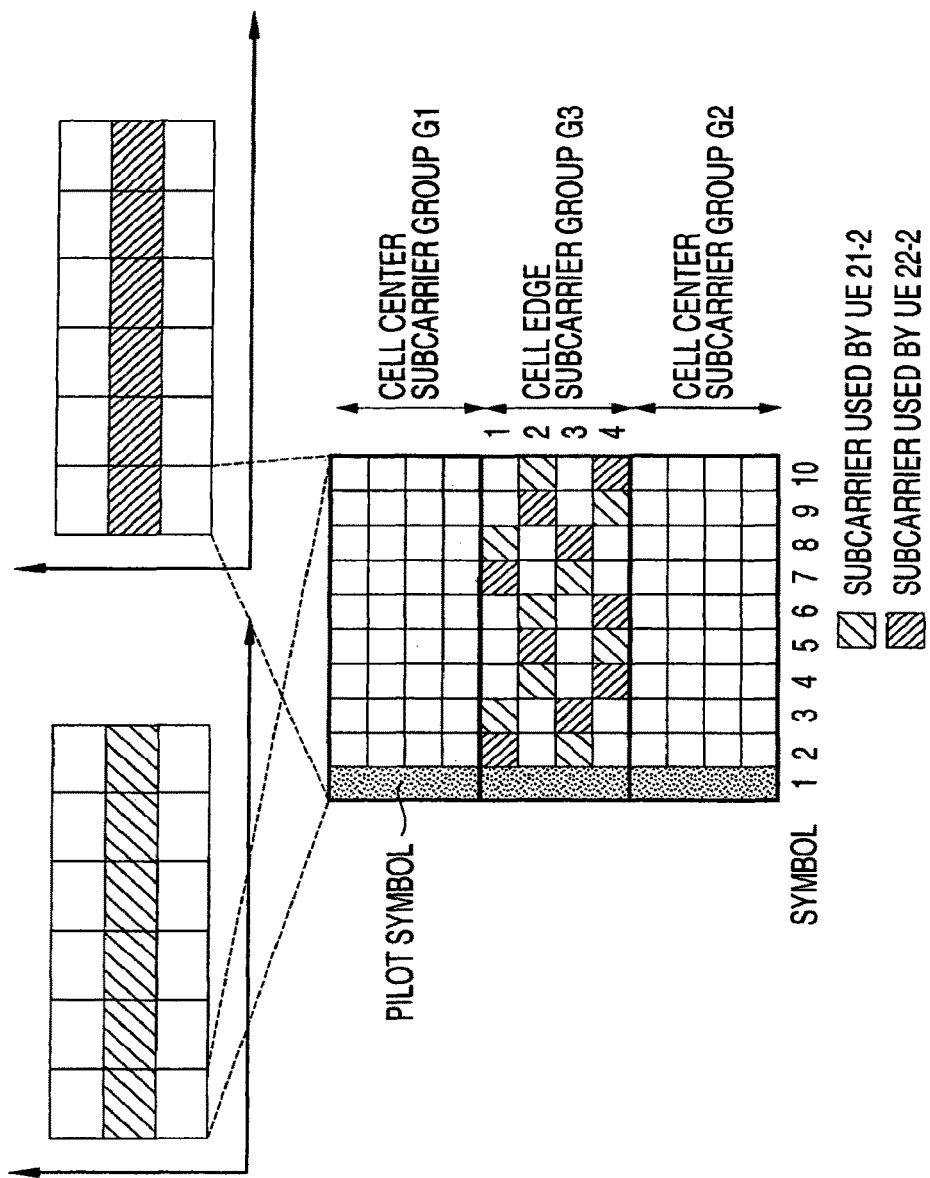

WIRELESS COMMUNICATION APPARATUS AND WIRELESS COMMUNICATION METHOD

CROSS-REFERENCE TO RELATED APPLICATIONS

This application is a continuation of U.S. application Ser. No. 11/723,880 filed Mar. 22, 2007, the entire contents of which are incorporated herein by reference.

BACKGROUND

1. Field

This invention relates to a base station and a wireless communication method using a multicarrier wireless communication system.

2. Related Art

Conventionally, in a cellular system, whole service area is divided into cell units and a base station and a plurality of wireless terminals communicates with each other a each cell. In the cellular system, the adjacent cells are designed overlapping each other so that communications are also able to be conducted on the boundary between the cells. Thus, if the same frequency band is assigned to the cells, inter-cell interference may occur in the area where the adjacent cells overlap each other (which will be hereinafter referred to as a cell edge).

JP-A 2001-231077 (KOKAI) discloses a system in which a frequency band is time-divided to be assigned to the cells with a time shift as a system in which inter-cell interference does not occur even when the same frequency band is assigned to the cells.

In this system, frequency band A assigned to the system is time-divided into slots S1, S2, . . . and the slots S1, S2, . . . are assigned to cells C1, C2, . . . . In each cell C1, C2, a base station and a plurality of wireless terminals occupy the frequency band A for communicating with each other within the time of the assigned slot S1, S2, . . . . Accordingly, the same frequency band is not used within the same time in each cell C1, C2, . . . , and inter-cell interference in the cell edge is not occurred.

SUMMARY

In the system described in JP-A 2001-231077 (KOKAI), however, when the frequency band A is used in the cell C1 during the Slot S1, the frequency band A is not used in other cells C2, C3, . . . during the time. Thus, if the number of cells belonging to the system increases, the whole throughput of the system may be lowered in proportion to the number of cells.

The present invention has been made in view of above circumstances. Aspects of the invention provides a base station and a wireless communication method capable of suppressing interference with the adjacent cell while suppressing to lower the whole throughput of the system and ensuring the communication throughput in each cell.

An aspect of the present invention provides a base station including: a communication unit configured to communicate with a wireless terminal; a determination unit that determines whether or not the wireless terminal is in a cell edge which is a first communication area to be overlapped with other communication area based on a signal reception state of the wireless terminal; and a controller that controls the communication unit to communicate with the wireless terminal to alternately use one of first subcarriers when the wireless terminal is determined to be in the first communication area and that controls the communication unit to communicate with the wireless terminal to use a second subcarrier when the wireless terminal is determined to be outside of the cell edge which is a second communication area to be not overlapped with other communication area.

BRIEF DESCRIPTION OF THE DRAWINGS

FIGS. 6A and 6B are drawings to show a wireless frame format according to the first embodiment;

FIG. 7 is a drawing to show the slot configuration of a wireless frame used by a first NodeB station according to the first embodiment;

FIG. 8 is a drawing to show the slot configuration of a wireless frame used by a second NodeB according to the first embodiment;

FIG. 9 is a drawing to show the slot configuration of wireless frames used by the first NodeB and second NodeB according to the first embodiment;

DETAILED DESCRIPTION

Various embodiments according to the invention will be described hereinafter with reference to the accompanying drawings.

First Embodiment

A wireless communication system according to a first embodiment of the invention will be discussed with FIGS. 1 to 21.

Figure 1:
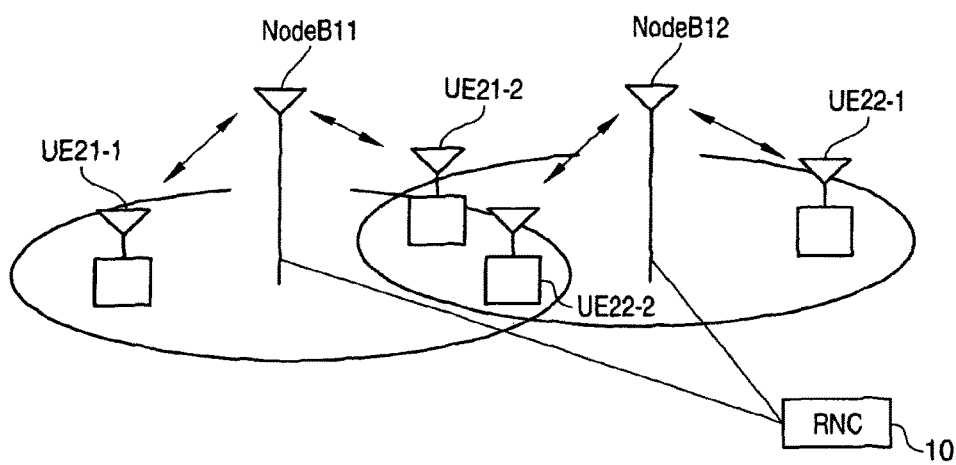
FIG. 1 is a drawing to show a wireless communication system according to a first embodiment of the invention.

The wireless communication system shown in FIG. 1 includes a Radio Network Controller (RNC) 10, base station apparatus (NodeB) 11 and 12 managed by the RNC 10, and terminals (UE) 21-1, 21-2, . . . , 22-1, 22-2, . . . receiving service from the NodeB 11 and NodeB 12. In the description to follow, it is assumed that the UEs receiving service from the NodeB 11 and NodeB 12 are four of UE 21-1, UE 21-2, UE 22-1, and UE 22-2. The range in which the NodeB 11 can perform service of telephone call, data communications, etc., for each UE (which will be hereinafter referred to as communication area A1) and the range in which the NodeB 12 can perform service for each UE (which will be hereinafter referred to as communication area A2) overlap each other and hereinafter the overlap area will be referred to as a cell edge.

It is assumed that the NodeB 11 performs service using a multicarrier wireless communication system for the UE 21-1, UE 21-2, and UE 22-2 existing in the communication area A1. On the other hand, it is assumed that the NodeB 12 performs service using a multicarrier wireless communication system for the UE 21-2, UE 22-1, and UE 22-2 existing in the communication area A2. That is, the UE 21-2 and UE 22-2 exist in the cell edge and may receive service from either of the NodeB 11 and NodeB 12. In the description to follow, however, it is assumed that the UE 21-2 receives service from the NodeB 11 and the UE 22-2 receives service from the NodeB 12. If the NodeB 11 and NodeB 12 conduct communications using the same frequency band at the same time for the UEs existing in any other area than the cell edge of the communication area A1, A2 (which will be hereinafter referred to as cell center), such as the UE 21-1 and UE 22-1, mutual communications do not interfere with each other.

In FIG. 1, the number of NodeB managed by the RNC 10 is two, but more than two NodeB may be managed. In FIG. 1, the NodeB 11 and NodeB 12 existing at geographic distant positions from each other have the communication areas A1 and A2 respectively, but one NodeB may have a plurality of communication areas like sectors in a cell.

Next, the configuration of subcarriers when the multicarrier wireless communication system is used will be discussed with FIGS. 2A to 5B. Here, a configuration example of subcarriers used by the NodeB 11 will be discussed, but the configuration of subcarriers used by the NodeB 12 is similar to that used by the NodeB 11. Subcarriers used for communications with the UE 21-1 existing in the cell center of the NodeB 11 are called cell center subcarriers and subcarriers used for communications with the UE 21-2 existing on the cell edge of the NodeB 11 are called cell edge subcarriers.

Figure 2A:
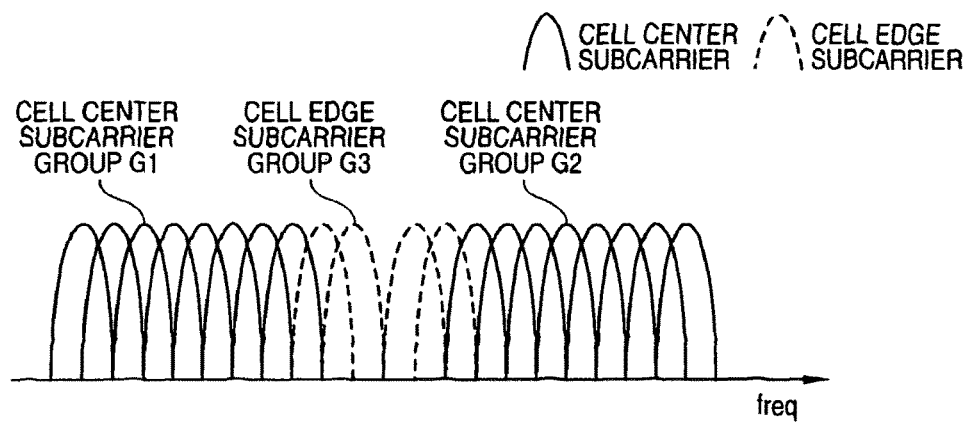
FIGS. 2A and 2B are drawings to show placement of subcarriers when a multicarrier wireless communication system, such as OFDM communication system is used according to the first embodiment.
Figure 2B:
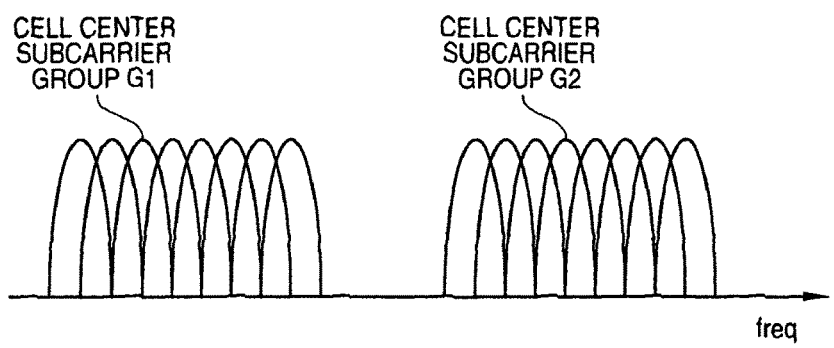

FIGS. 2A and 2B are drawings to show placement of subcarriers when a multicarrier wireless communication system, such as OFDM communication system is used. In FIGS. 2A and 2B, the cell center subcarriers are indicated by solid lines and the cell edge subcarriers are indicated by dotted lines.

The subcarriers shown in FIGS. 2A and 2B are made up of cell center subcarrier groups G1 and G2 each having M (in FIGS. 2A and 2B, M=8) cell center subcarriers and a cell edge subcarrier group G3 having F (in FIGS. 2A and 2B, F=4) cell edge subcarriers, and the cell edge subcarrier group G3 is placed between the cell center subcarrier groups G1 and G2.

FIG. 2A shows an example of conducting communications using the cell edge subcarriers in addition to the cell center subcarriers. On the other hand, FIG. 2B shows an example of conducting communications using only the cell center subcarriers. The NodeB 11 communicates with the UE 21-1, UE21-2 using the subcarriers shown in FIG. 2A or 2B.

Downlink communications from the NodeB 11 to the UE 21-1, UE 21-2 and uplink communications from the UE 21-1, UE 21-2 to the NodeB 11 can be divided using time division duplex (TDD), frequency division duplex (FDD), etc.

For the NodeB 11 to communicate with a plurality of UEs, time division multiplexing access, frequency division multiplexing access, orthogonal frequency division multiplexing access, code-division multiple access, etc., is used.

Modified Example 1 of Subcarrier Placement

Figure 3A:
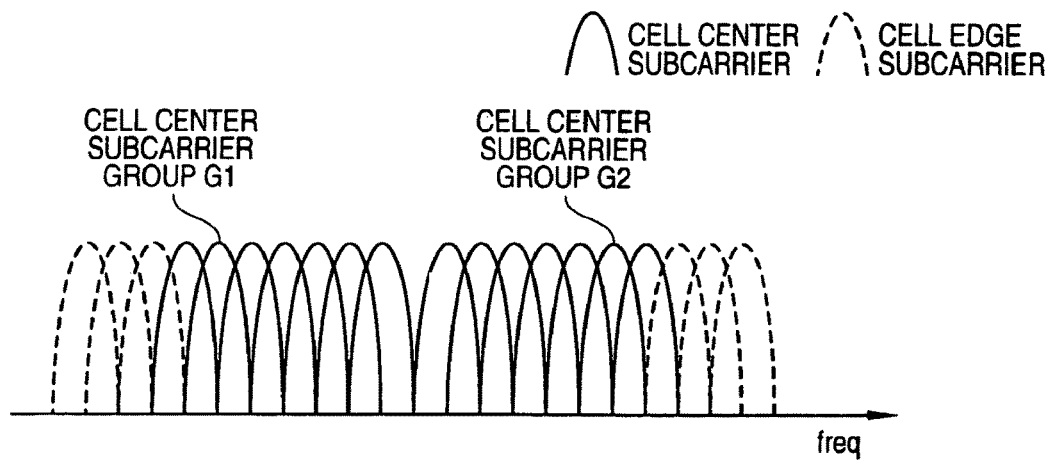
FIGS. 3A and 3B are drawings to show a modified example 1 of subcarrier placement when the multicarrier wireless communication system, such as OFDM communication system is used.
Figure 3B:
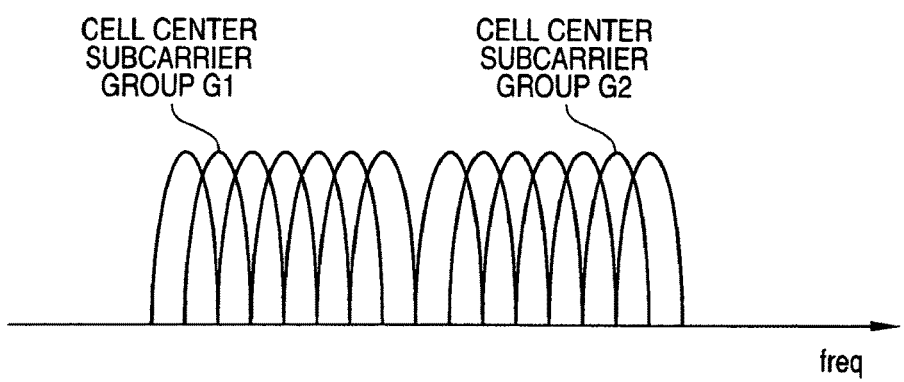

FIGS. 3A and 3B are drawings to show modified example 1 of subcarrier placement when the multicarrier wireless communication system, such as OFDM communication system is used.

In FIGS. 2A and 2B, the cell edge subcarrier group G3 is placed between the cell center subcarrier groups G1 and G2. On the other hand, in the modified example shown in FIGS. 3A and 3B, the cell center subcarrier groups G1 and G2 are placed adjacent to each other and cell edge subcarriers are placed at both sides, namely, at the low frequency side of the cell center subcarrier group G1 and at the high frequency side of the cell center subcarrier group G2. FIG. 3A shows an example of conducting communications using the cell edge subcarriers in addition to the cell center subcarriers, and FIG. 3B shows an example of conducting communications using only the cell center subcarriers.

Modified Example 2 of Subcarrier Placement

Figure 4A:
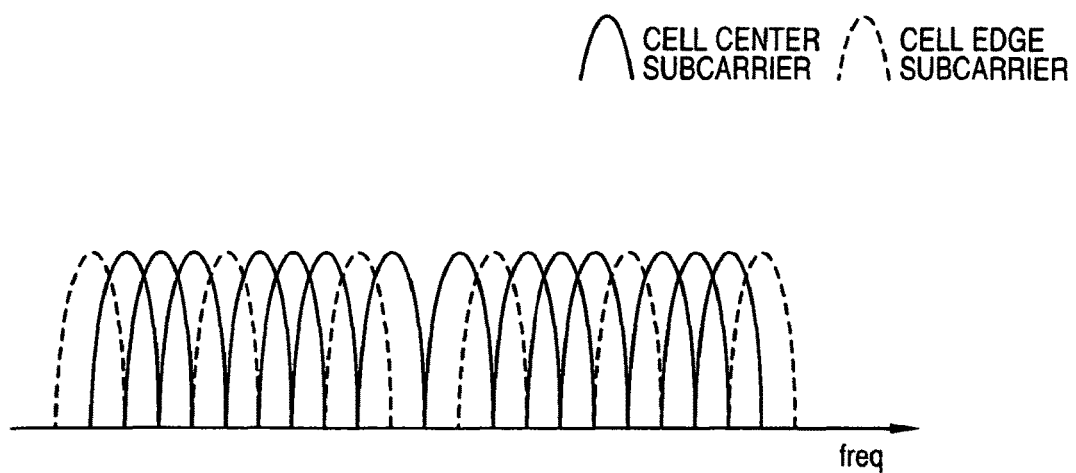
FIGS. 4A and 4B are drawings to show a modified example 2 of subcarrier placement when the multicarrier wireless communication system, such as OFDM communication system is used.
Figure 4B:
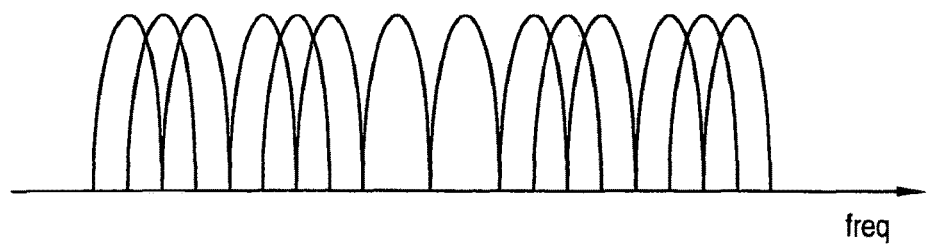

Subcarriers shown in FIGS. 4A and 4B have a configuration wherein three cell center subcarriers are placed between cell edge subcarriers. That is, in the subcarrier placement, one cell edge subcarrier is placed every four subcarriers. Here, the case where a cell edge subcarrier is placed every four subcarriers is shown, but unless the cell edge subcarriers are adjacent with each other, the cell edge subcarrier may be placed every given number of subcarriers or may be placed at any desired interval.

Modified Example 3 of Subcarrier Placement

Figure 5A:
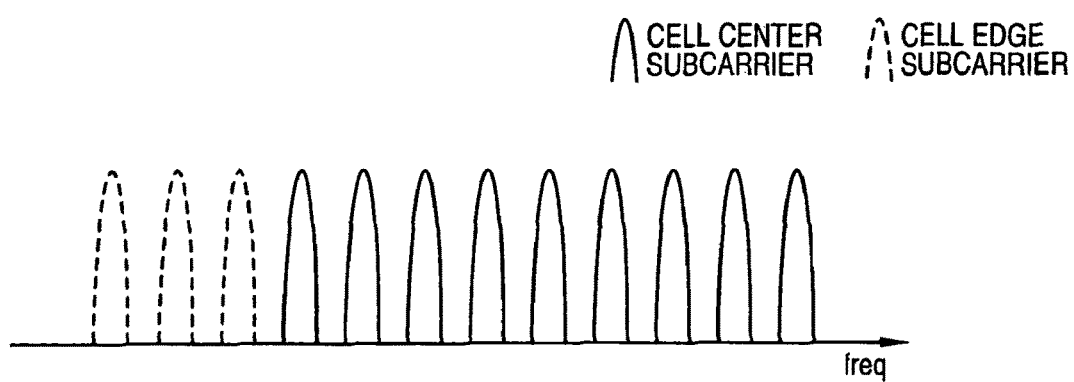
FIGS. 5A and 5B are drawings to show a placement example of subcarriers when a frequency division multiplexing communication system is used.
Figure 5B:
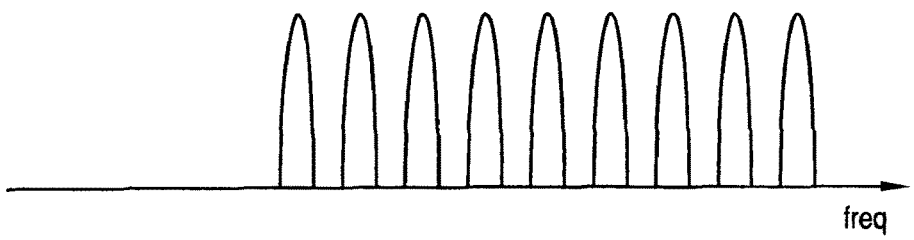

Unlike the subcarriers shown in FIGS. 2A to 4B, the subcarriers shown in FIGS. 5A and 5B are independent from each other with respect to frequencies without overlapping each other. FIG. 5A shows an example of conducting communications using cell edge subcarriers in addition to cell center subcarriers, and FIG. 5B shows an example of conducting communications using cell center subcarriers.

As shown in FIG. 5A, a cell edge subcarrier group G3 is placed on the low frequency side of a cell center subcarrier group G1. Downlink communications from the NodeB 11 to the UE 21-1, UE 21-2 and uplink communications from the UE 21-1, UE 21-2 to the NodeB 11 can be divided using time division duplex (TDD), frequency division duplex (FDD), etc.

For the NodeB 11 and a plurality of UEs to communicate with each other using cell center subcarriers or cell edge subscribers, time division multiplexing access, frequency division multiplexing access, code-division multiple access, etc., is used.

Subsequently, a use example of the cell edge subcarriers will be discussed with FIGS. 6A to 11.

FIG. 6A shows the wireless frame format applied for the NodeB 11, and FIG. 6B shows the wireless frame format applied for the NodeB 12. The NodeB 11 and NodeB 12 perform service using the same frequency band. FIGS. 6A and 6B display the wireless frame formats of the same frequencies.

The wireless frame format applied for the NodeB 11 shown in FIG. 6A displays the frequency axis in FIG. 2A on the vertical axis and the time on the horizontal axis, and a cell edge subcarrier group G3 made up of F subcarriers is placed between cell center subcarrier groups G1 and G2 each made up of M subcarriers. On the time axis, each subcarrier is divided in slot.

The wireless frame format applied for the NodeB 12 shown in FIG. 6B is the same as that in FIG. 6A and therefore will not be discussed again. For the formats shown in FIGS. 6A and 6B, the subcarrier placement in FIG. 2A is used, but any of the subcarrier placements in FIGS. 3A to 5B may be used.

Next, the slot configuration of a wireless frame will be discussed with FIGS. 7 to 9.

In FIGS. 7 to 9, the number of subcarriers of each of the cell center subcarrier groups G1 and G2 is M=4 and the number of subcarriers of the cell edge subcarrier group G3 is F=4. The cell edge subcarriers are called cell edge subcarrier 1, 2, 3, and 4 in order from the subcarrier on the high frequency side.

FIG. 7 is a drawing to show the slot configuration of a wireless frame applied for the NodeB 11. One slot is made up of 10 symbols 1 to 10 and the top symbol 1 is a pilot symbol. To transmit a signal using cell center subcarriers, the NodeB 11 uses the subcarriers of the cell center subcarrier group G1, G2 to transmit the signal.

On the other hand, to transmit a signal using the cell edge subcarrier group G3, the NodeB 11 changes cell edge subcarriers 1 to 4 used for signal transmission in symbol units to make a transition. That is NodeB 11 alternately uses one of the cell edge subcarriers 1 to 4.

For example, in FIG. 7, the NodeB 11 first transmits a pilot symbol using the cell edge subcarriers 1 to 4 in the top symbol 1 of the slot, and transmits using the cell edge subcarrier 3 in the next symbol 2. Further, the NodeB 11 transmits signal using the cell edge subcarrier 1 in the symbol 3.

FIG. 8 is a drawing to show the slot configuration of a wireless frame applied for the NodeB 12. The slot configuration of the NodeB 12 is almost the same as the slot configuration in FIG. 7 except for the transition pattern of the cell edge subcarriers.

To transmit a signal using the cell edge subcarrier group G3, the NodeB 12 first transmits a pilot symbol using the cell edge subcarriers 1 to 4 in the top symbol 1 of the slot. The NodeB 12 transmits using the cell edge subcarrier 1 in the subsequent symbol 2 and transmits signal using the cell edge subcarrier 3 in the next symbol 3.

FIG. 9 is a drawing to show signals arriving at the UE 21-2 and UE 22-2 when the NodeB 11 transmits a signal according to the subcarrier transition pattern shown in FIG. 7 and the NodeB 12 transmits a signal according to the subcarrier transition pattern shown in FIG. 8 at the same time. The UE 21-2 and UE 22-2 can receive both signals transmitted from the NodeB 11 and NodeB 12 and therefore the signals transmitted from both of the NodeB 11 and NodeB 12 arrive at each of the UE 21-2 and UE 22-2. However, the transition pattern of the cell edge subcarriers 1 to 4 of the NodeB 11 differs from that of the NodeB 12 and thus the transmission signals do not come into collision with each other.

A control circuit 131 described later with reference to FIG. 12 assigns the transition pattern of the cell edge subcarriers 1 to 4 in symbol units shown in FIG. 7, 8 to each UE for transmitting a signal using the cell edge subcarrier group G3. Assignment of the transition pattern is described later in detail.

Next, the configuration of each pilot symbol of the cell edge subcarrier group G3 will be discussed with FIGS. 10A to 10C.

The pilot symbol is a very important symbol because the UE receiving a signal uses the pilot symbol as a reference symbol at the demodulating, for example. Therefore, preferably the pilot symbols transmitted from the NodeB 11 and NodeB 12 are orthogonal to each other so that the pilot symbols of the cell edge subcarrier group G3 do not interfere with each other.

Figure 10A:
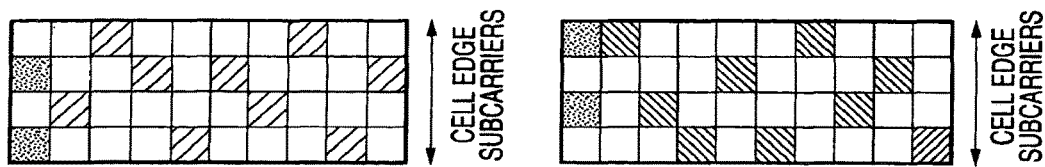
FIGS. 10A to 10C are drawings to show the configuration of each pilot symbol of cell edge subcarriers according to the first embodiment.
Figure 10B:
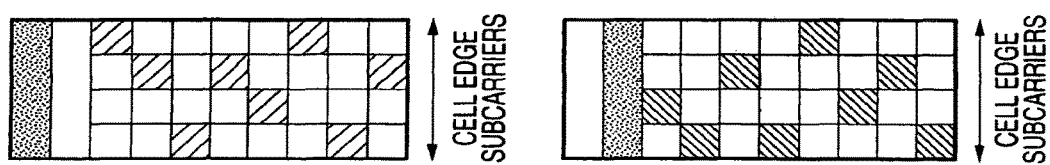
Figure 10C:
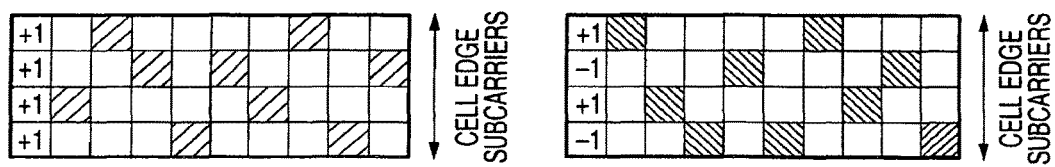

Then, FIGS. 10A to 10C show configuration examples wherein the pilot symbols are orthogonal to each other. The pilot symbol transmitted from the NodeB 11 is shown on the left of each of FIGS. 10A to 10C and the pilot symbol transmitted from the NodeB 12 is shown on the right.

FIG. 10A is a drawing to show an example wherein the pilot symbols are made orthogonal to each other on the frequency axis. For example, the NodeB 11 transmits the pilot symbol using the cell edge subcarriers 2 and 4, and the NodeB 12 transmits the pilot symbol using the cell edge subcarriers 1 and 3. At this time, the NodeB 11 does not transmit a signal in the cell edge subcarriers 1 and 3, and the NodeB 12 does not transmit a signal in the cell edge subcarriers 2 and 4.

FIG. 10B is a drawing to show an example wherein the pilot symbols are made orthogonal to each other on the time axis. In this case, each pilot symbol is transmitted using not only the top symbol 1 of the slot, but also the symbol 2. For example, the NodeB 11 transmits the pilot symbol using the cell edge subcarriers 1 to 4 in the symbol 1, and the NodeB 12 transmits the pilot symbol using the cell edge subcarriers 1 to 4 in the symbol 2.

FIG. 10C is a drawing to show an example wherein the pilot symbols are made orthogonal to each other using orthogonal code. For example, the pilot symbol transmitted from the NodeB 11 is a series of +1, +1, +1, +1, and the pilot symbol transmitted by the NodeB 12 is a series of +1, −1, −1, +1.

Figure 11:
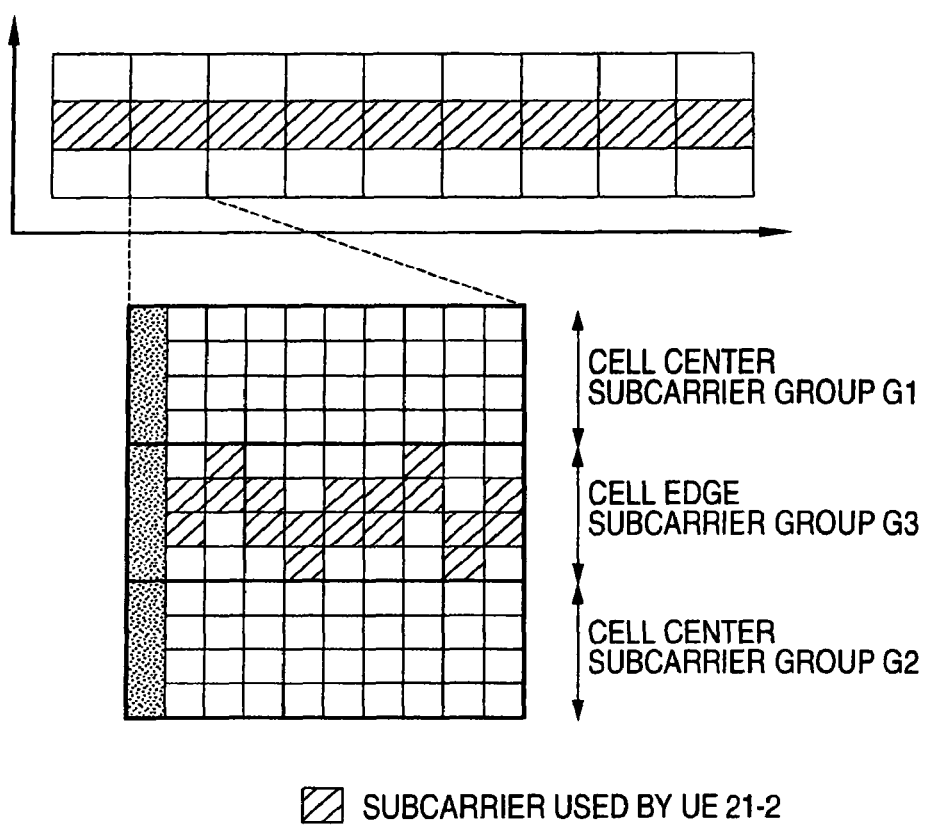
FIG. 11 is a drawing to show a first modified example of the slot configuration of the cell edge subcarriers.
Figure 12:
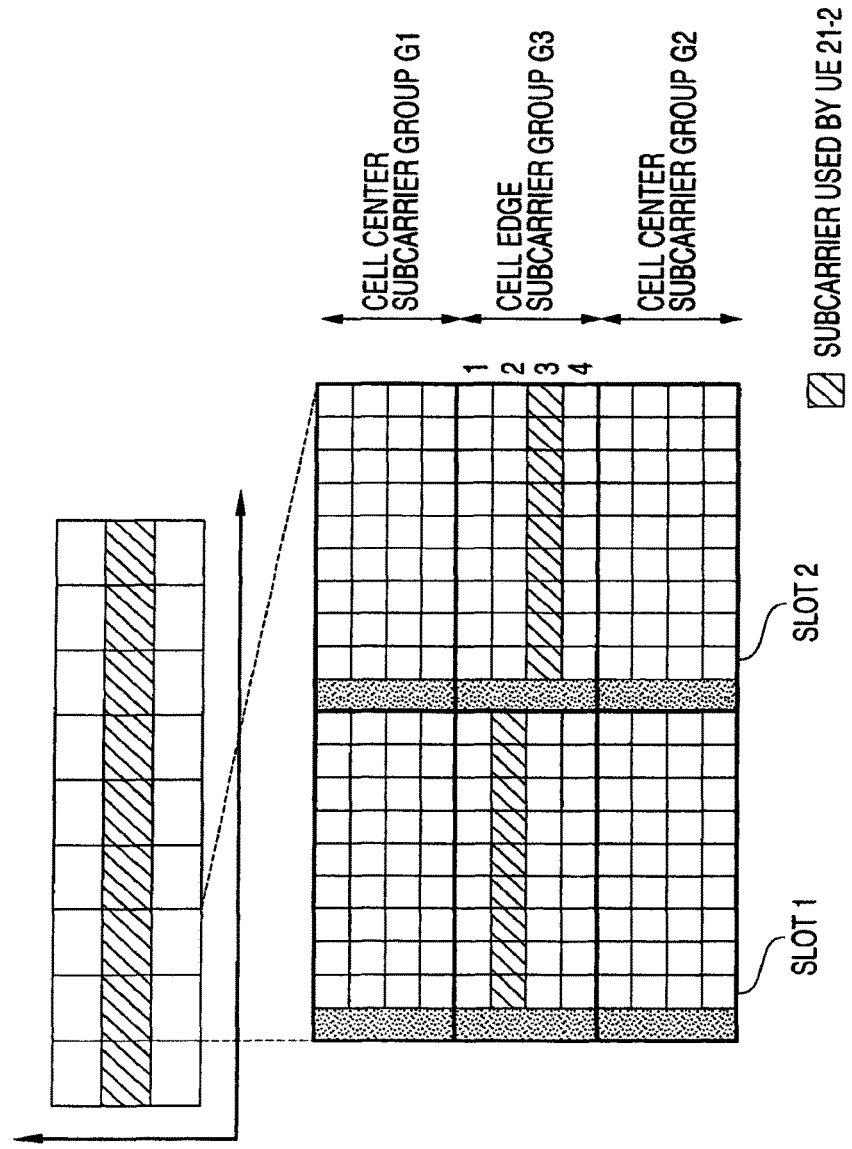
FIG. 12 is a drawing to show a second modified example of the slot configuration of the cell edge subcarriers.
Figure 13:
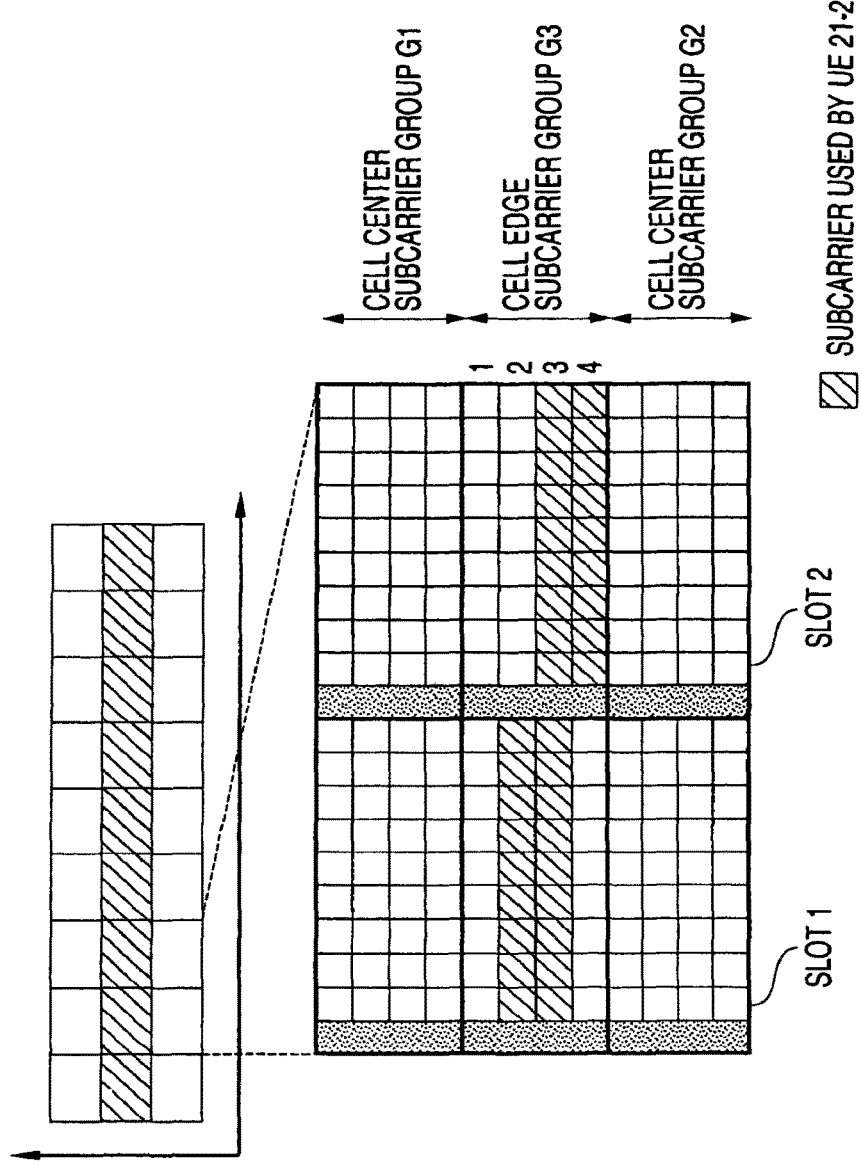
FIG. 13 is a drawing to show a third modified example of the slot configuration of the cell edge subcarriers.

Next, modified examples of the slot configuration of the cell edge subcarriers are shown with FIGS. 11 to 13. Here, the slot configuration of a wireless frame applied for the NodeB 11 is shown, but the slot configuration of a wireless frame applied for the NodeB 12 can also be modified in a similar manner.

Modified Example 1 of Slot Configuration

In each of the slots shown in FIGS. 7 to 9, a signal is transmitted using one cell edge subcarrier in units of one symbol; in the slot shown in FIG. 11, a signal is transmitted using two cell edge subcarriers in units of one symbol. Thus, to change subcarriers to make a transition in symbol units, a plurality of cell edge subcarriers may be used for signal transmission.

Modified Example 2 of Slot Configuration

In FIGS. 7 to 9, the cell edge subcarriers are changed to make a transition in symbol units; the cell edge subcarriers may be changed to make a transition in slot units as shown in FIG. 12. In this case, for example, the NodeB 11 first transmits a signal using the cell edge subcarrier 2 in slot 1, changes the subcarrier to make a transition to the cell edge subcarrier 3 in the next slot 2, and conducts communications using the cell edge subcarrier 3.

Modified Example 3 of Slot Configuration

In FIG. 12, a signal is transmitted using one cell edge subcarrier in units of one slot; in FIG. 13, a signal is transmitted using two cell edge subcarriers in units of one slot. Thus, to change subcarriers to make a transition in slot units, a plurality of cell edge subcarriers may be used for signal transmission.

Although the wireless frame formats to transmit a signal from the base station (NodeB) to the terminal (UE) have been described with FIGS. 7 to 13, the wireless frame formats to transmit a signal from UE to NodeB are also similar to those described with FIGS. 7 to 13.

Next, the configuration of the base station apparatus (NodeB) according to the embodiment will be discussed with FIGS. 14 to 16. Since the NodeB 11 and NodeB 12 have the same configuration, the configuration of the NodeB 11 will be discussed.

Figure 14:
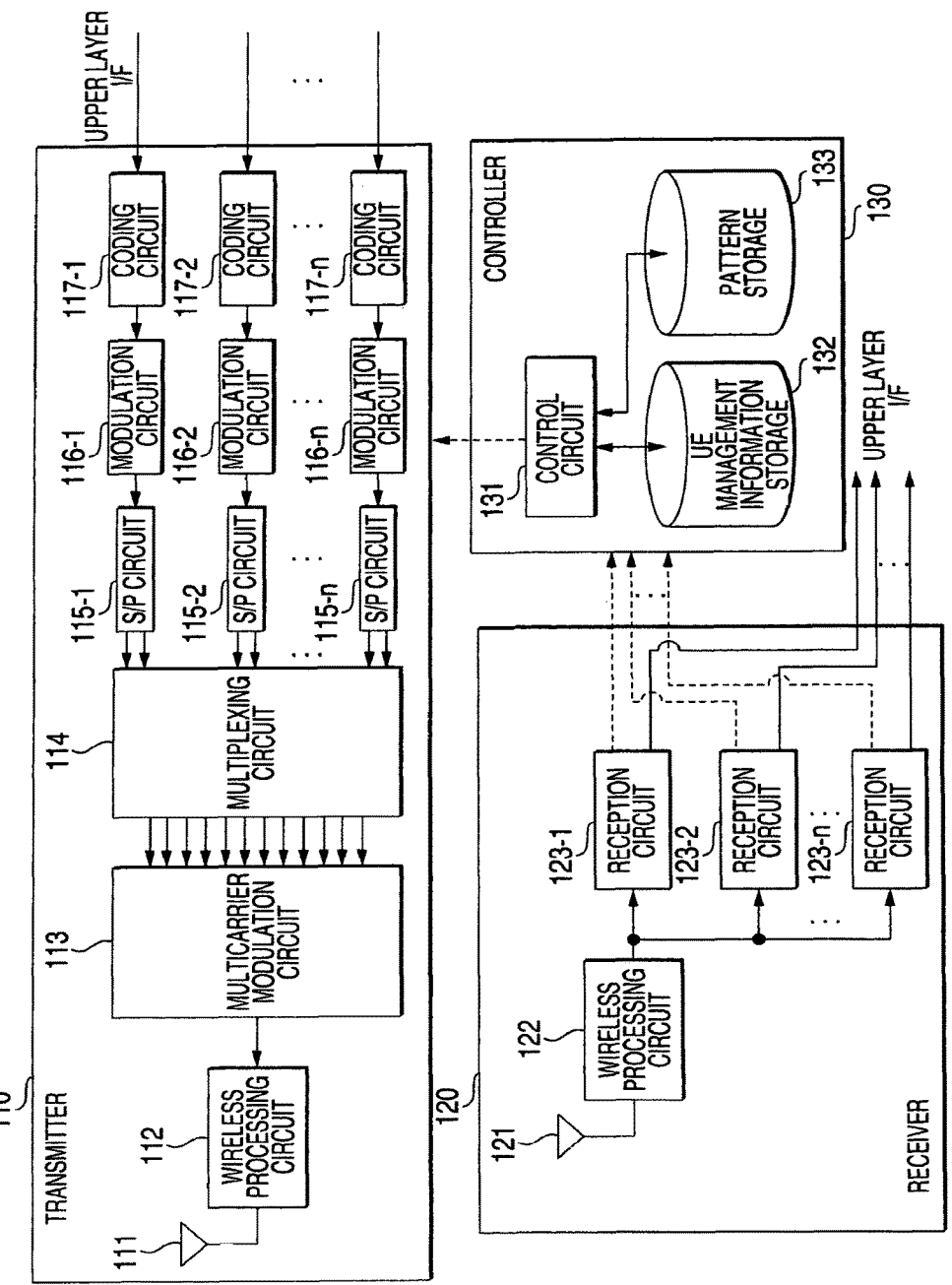
FIG. 14 is a block diagram to show the first NodeB according to the first embodiment.
Figure 15:
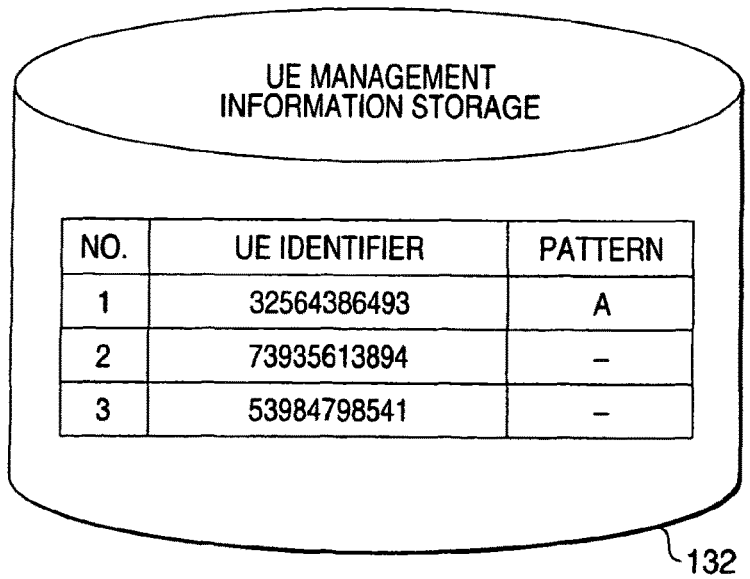
FIG. 15 is a drawing to show a table of a UE management information storage according to the first embodiment.

FIG. 14 is a block diagram to show the configuration of the NodeB 11.

The NodeB 11 includes a transmitter 110 having a transmission antenna 111, a transmission wireless processing circuit 112, a multicarrier modulation circuit 113, a multiplexing circuit 114, S/P circuits 115-1 to 115-$n$, modulation circuits 116-1 to 116-$n$, and coding circuits 117-1 to 117-$n$, a receiver 120 having a reception antenna 121, a reception wireless processing circuit 122, and reception circuits 123-1 to 123-$n$, and a controller 130 having a control circuit 131, a UE management information storage 132, and a pattern storage 133.

$n$ of S/P circuits 115-1 to 115-$n$, modulation circuits 116-1 to 116-$n$, etc., means the number of UEs with which the NodeB 11 communicates at one time.

Next, the components of the NodeB 11 will be discussed in detail.

The transmitter 110 shown in FIG. 14 has the coding circuits 117-1 to 117-$n$ for coding the data input from an upper layer I/F and to be transmitted to each UE, the modulation circuits 116-1 to 116-$n$ for modulating the data coded by the coding circuits 117-1 to 117-$n$ to generate a modulated signal, the S/P circuits 115-1 to 115-$n$ for performing S/P conversion for the modulated signals generated by the modulation circuits 116-1 to 116-$n$, the multiplexing circuit 114 for inserting a pilot symbol into the signal input from each S/P circuit and further mapping the signals so as to transmit the signals with predetermined subcarriers, the multicarrier modulation circuit 113 for performing multicarrier modulation for the modulated signals input from the multiplexing circuit 114 to generate a multicarrier modulated signal, and the transmission wireless processing circuit 112 for performing wireless processing for the multicarrier modulated signal and transmitting the signal through the transmission antenna 111.

The receiver 120 has the reception wireless processing circuit 122 for performing wireless processing for the wireless signal received at the reception antenna 121 to generate a reception signal and the reception circuits 123-1 to 123-$n$ for performing demodulation processing, etc., for the reception signal.

Subsequently, the controller 130 has the control circuit 131 for referencing the UE management information storage 132 and the pattern storage 133 and determining the transition pattern of the cell edge subcarriers to be assigned to UE, etc. The UE management information storage 132 stores information of UE with which the NodeB 11 communicates. The pattern storage 133 stores the transition pattern of the cell edge subcarriers.

The UE management information storage 132 will be discussed in detail with FIG. 15. FIG. 15 is a drawing to show a table of the UE management information storage 132. The UE management information storage 132 stores a UE identifier for uniquely identifying the UE with which the NodeB 11 communicates (in FIG. 15, 11-digit numeric value) and "pattern" indicating the transition pattern of the cell edge subcarriers when the UE uses the cell edge subcarriers. When the cell center subcarriers are used, the pattern becomes blank (in FIG. 15, "–" is entered); when the cell edge subcarriers are used, a symbol indicating the transition pattern is stored. The symbol indicating the transition pattern is described later.

Next, the pattern storage 133 will be discussed in detail with FIG. 16. FIG. 16 is a drawing to show a table of the pattern storage 133. The pattern storage 133 stores the transition patterns of the cell edge subcarriers and unique symbols provided in a one-to-one correspondence with the transition patterns.

Figure 16:
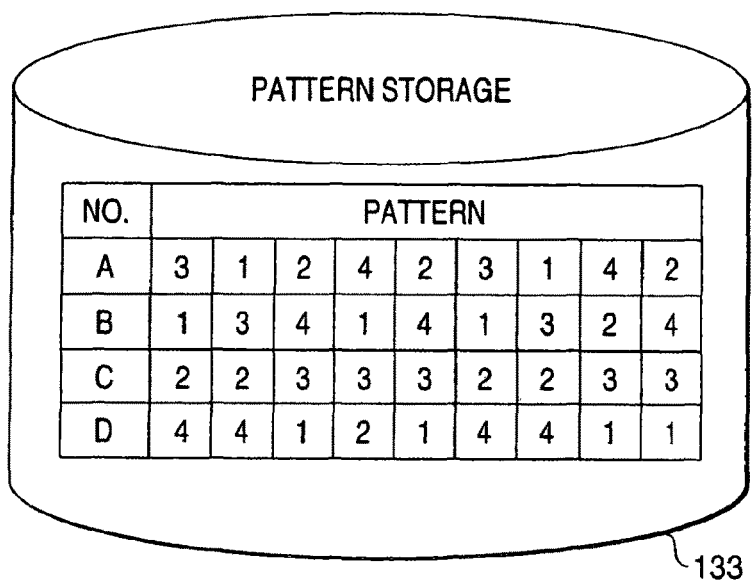
FIG. 16 is a drawing to show a table of a pattern storage according to the first embodiment.

In the table shown in FIG. 16, each transition pattern is stored as the numbers assigned to the cell edge subcarriers. For example, transition pattern "A" shown in the table is "3, 1, 2, . . . ." That is, the transition pattern "A" means that a signal is transmitted using the cell edge subcarrier 3 in the symbol 2 shown in FIG. 7 and is transmitted using the cell edge subcarrier 1 in the next symbol 3 and is transmitted using the cell edge subcarrier 2 in the subsequent symbol 4.

The configuration of the UE according to the embodiment will be discussed with FIG. 17. Since the UE 21-1, UE 21-2, UE 22-1, and UE 22-2 have the same configuration, only the configuration of the UE 21-1 will be discussed.

Figure 17:
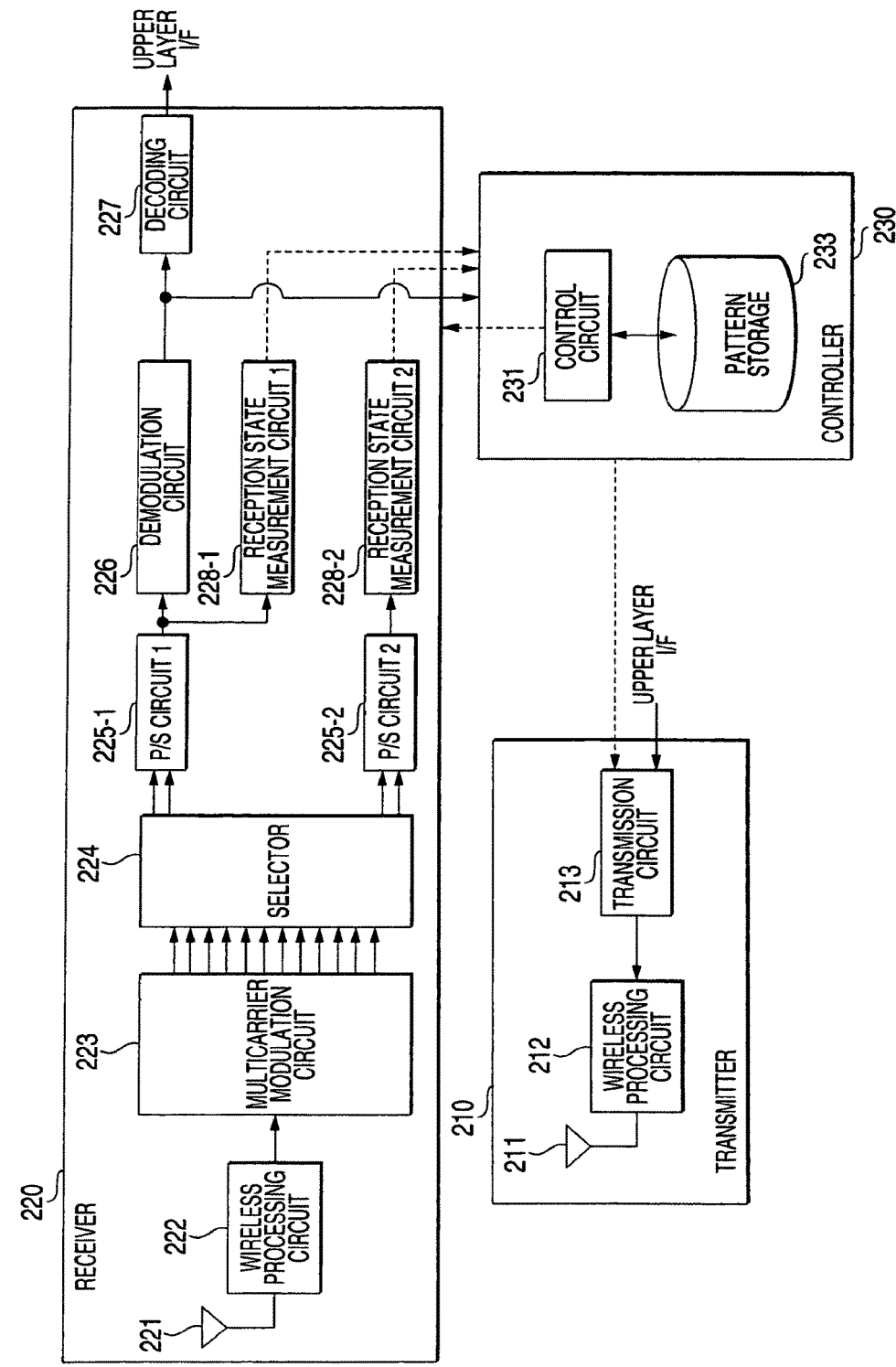
FIG. 17 is a block diagram to show a terminal according to the first embodiment.

The UE 21-1 shown in FIG. 17 includes a transmitter 210 having a transmission antenna 211, a transmission wireless processing circuit 212, and a transmission circuit 213, a receiver 220 having a reception antenna 221, a reception wireless processing circuit 222, a multicarrier demodulation circuit 223, a selector 224, a first P/S circuit 225-1, a second P/S circuit 225-2, a demodulation circuit 226, a decoding circuit 227, a first reception state measurement circuit 228-1, and a second reception state measurement circuit 228-2, and a controller 230 having a control circuit 231 and a pattern storage 233.

The components of the UE 21-1 will be discussed.

The transmitter 210 includes the transmission circuit 213 for performing processing of coding, modulation, etc., for the data to be transmitted to generate a modulated signal, and the transmission wireless processing circuit 212 for performing wireless processing for the modulated signal and transmitting the signal through the transmission antenna 211.

Next, the receiver 220 has the reception wireless processing circuit 222 for performing wireless processing for the wireless signal received at the reception antenna 221 to generate a reception signal, the multicarrier demodulation circuit 223 for performing multicarrier demodulation for the reception signal, the selector 224 for selecting a signal to be input to the first P/S circuit 225-1 or the second P/S circuit 225-2, the first P/S circuit 225-1 for performing P/S conversion for the signal input through the selector 225 and outputting the conversion result to the demodulation circuit 226 and the first reception state measurement circuit 228-1, the second P/S circuit 225-2 for performing P/S conversion for the signal input through the selector 225 and outputting the conversion result to the second reception state measurement circuit 228-2, the demodulation circuit 226 for performing demodulation for the signal input from the first P/S circuit 225-1, the decoding circuit 227 for decoding the signal provided by the demodulation circuit 226 and outputting the result to the upper layer I/F, the first reception state measurement circuit 228-1 for measuring a signal-to-interference and noise power ratio (SINR), for example, of the signal input from the first P/S circuit 225-1 and sending the result to the controller 230, and the second reception state measurement circuit 228-2 for measuring signal power and SINR, for example, of the signal input from the second P/S circuit 225-2 and sending the result to the controller 230.

The controller 230 has the control circuit 231 for determining whether to use the cell center subcarriers or to use the cell edge subcarriers for communications with the NodeB based on the reception state measurement results input from the first reception state measurement circuit 228-1 and the second reception state measurement circuit 228-2, and the pattern storage 233 for previously storing the transition pattern of the cell edge subcarriers used when the cell edge subcarriers are used for communications with the NodeB. The pattern storage 233 has the same configuration as the pattern storage 133 of the NodeB 11 shown in FIG. 16 and therefore will not be discussed.

Next, the operation of the wireless communication system according to the first embodiment of the invention will be discussed with FIGS. 14 to 21.

First, the operation of the NodeB 11 will be discussed with FIG. 14. The operation of the NodeB 12 is the same as the operation of the NodeB 11 and therefore will not be discussed.

For the NodeB 11 to transmit a signal, data k to be transmitted to the UE 21-$k$ ($k=1, 2, \ldots, n$) is input from the upper layer I/F to the coding circuit 117-$k$. The coding circuit 117-$k$ performs error correction coding for the input data k according to a predetermined coding scheme and coding ratio and inputs the result to the corresponding modulation circuit 116-$k$. The modulation circuit 116-$k$ performs modulation for the input data k according to a predetermined modulation scheme and inputs a modulated signal k to the corresponding S/P circuit 115-$k$. The S/P circuit 115-$k$ performs S/P conversion for the input modulated signal k and inputs the result to the multiplexing circuit 114. The multiplexing circuit 114 inserts a pilot symbol in the top symbol of the slot and maps the modulated signal k input from the S/P circuit 115-$k$ so as to transmit the signal with a predetermined subcarrier in any other symbol than the top symbol. At this time, if there is UE using the cell edge subcarriers for communications, the multiplexing circuit 114 maps in accordance with the transition pattern corresponding to the UE. The controller 130 sends a notification of the subcarrier for mapping the modulated signal k, the presence or absence of UE using the cell edge subcarriers, the transition pattern of the cell edge subcarriers, etc.

Subsequently, the multicarrier modulation circuit 113 performs multicarrier modulation for the signal input from the multiplexing circuit 114 to generate a multicarrier modulated signal, and inputs the multicarrier modulated signal to the transmission wireless processing circuit 112. The transmission wireless processing circuit 112 performs predetermined wireless processing of D/A conversion, quadrature modulation, up conversion, band limiting, power amplification, etc., for the input multicarrier modulated signal to generate a wireless signal. The generated wireless signal is transmitted through the transmission antenna 111.

On the other hand, for the NodeB 11 to receive a signal, the wireless signal received at the reception antenna 121 is input to the reception wireless processing circuit 122. The reception wireless processing circuit 122 performs predetermined wireless processing of band limiting, down conversion, quadrature demodulation, A/D conversion, etc., for the input wireless signal and inputs the signal to the reception circuits 123-1 to 123-$n$ as the reception signal. The reception circuits 123-1 to 123-$n$ demodulate the input reception signal according to the demodulation scheme corresponding to the predetermined modulation scheme and decodes based on a predetermined coding scheme and coding ratio and if the decoding result is control data of the reception state measurement result, etc., output the control data to the controller 130; if the decoding result is information data, output the information data to the upper layer I/F.

Next, the operation of the controller 130 of the NodeB will be discussed.

First, the control circuit 131 of the controller 130 uses the control data of the reception state measurement result, etc., input from the reception circuit 123-1, . . . , 123-$n$ to determine whether to use the cell center subcarriers or to use the cell edge subcarriers for communications with UE. This determination is described later in detail. The controller 230 of the UE may also make the determination. The determination made by the UE is described later.

If the subcarriers used by the UE are changed from the cell center subcarriers to the cell edge subcarriers as the result of the determination, the control circuit 131 references the UE management information storage 132, selects an unused transition pattern, assigns the transition pattern to communications with the UE, updates the table of the UE management information storage 132, and rewrites the pattern corresponding to the UE identifier of the UE to the symbol representing the selected transition pattern.

In contrast, if the subcarriers used by the UE are changed from the cell edge subcarriers to the cell center subcarriers as the result of the determination, the control circuit 131 updates the table of the UE management information storage 132, and erases the symbol representing the transition pattern stored in the pattern corresponding to the UE identifier of the UE. When transmitting a signal, the control circuit 131 references the UE management information storage 132 and the pattern storage 133, and sends the transition pattern of the UE using the cell edge subcarriers to the multiplexing circuit 114 of the transmitter 110, thereby controlling the subcarrier transition of the UE.

Next, the operation of the UE 21-1 will be discussed with FIG. 17. It is assumed that the UE 21-1 uses the cell center subcarriers to communicate with the NodeB 11. The operation of the UE 21-2, UE 22-1, UE 22-2 is the same as the operation of the UE 21-1 and therefore will not be discussed.

For the UE 21-1 to transmit a signal, the transmission circuit 213 performs error correction coding for the control data input from the controller 230 and the information data input from the upper layer I/F according to a predetermined coding scheme and coding ratio and modulates the input data according to a predetermined modulation scheme and inputs a modulated signal to the transmission wireless processing circuit 212. The transmission wireless processing circuit 212 performs predetermined wireless processing of D/A conversion, quadrature modulation, up conversion, band limiting, power amplification, etc., for the input modulated signal to generate a wireless signal. The generated wireless signal is transmitted through the transmission antenna 231.

On the other hand, for the UE 21-1 to receive a signal, the wireless signal received at the reception antenna 221 is input to the reception wireless processing circuit 222. The reception wireless processing circuit 222 performs predetermined wireless processing of band limiting, down conversion, quadrature demodulation, A/D conversion, etc., for the input wireless signal and inputs the signal to the multicarrier demodulation circuit 223 as the reception signal. The multicarrier demodulation circuit 223 performs multicarrier demodulation for the input reception signal and inputs the result to the selector 224. The selector 224 inputs the multicarrier modulation result corresponding to the subcarriers used for transmission to the UE 21-1 to the first P/S circuit 225-1 and inputs the pilot signal transmitted with cell edge subcarriers from the base station apparatus other than the NodeB 11 (here, NodeB 12) to the second P/S circuit 225-2. The pilot signal transmitted with cell edge subcarriers from the NodeB 11 may also be input to the second P/S circuit 225-2.

Subsequently, the first P/S circuit 225-1 performs P/S conversion for the multicarrier demodulation result input from the selector 224 and inputs the result to the demodulation circuit 226 and also inputs the pilot symbol of the conversion result to the first reception state measurement circuit 228-1. On the other hand, the second P/S circuit 225-2 performs P/S conversion for the pilot symbol input from the selector 224 and inputs the result to the second reception state measurement circuit 228-2.

The demodulation circuit 226 demodulates the P/S conversion result input from the first P/S circuit 225-1 according to the demodulation scheme corresponding to the predetermined modulation scheme and inputs the demodulation result to the decoding circuit 227 and if the demodulation result is control data such as a transition pattern of cell edge subcarriers, inputs the demodulation result to the controller 230. The decoding circuit 227 decodes the demodulation result input from the demodulation circuit 226 based on the predetermined coding scheme and coding ratio and outputs the result to the upper layer I/F.

The first reception state measurement circuit 228-1 uses the pilot symbol input from the first P/S circuit 225-1 to measure the wireless communication state with the NodeB 11, for example, SINR and sends the result to the control circuit 231. On the other hand, the second reception state measurement circuit 228-2 uses the pilot symbol input from the second P/S circuit 225-2 to measure the wireless communication state with the NodeB 12, for example, reception power and sends the result to the control circuit 231. The wireless communication state of communications with the NodeB 11 in the cell edge subcarriers, for example, the SINR of the pilot symbol transmitted from the NodeB 11 using the cell edge subcarriers may also be measured and the result may also be sent to the control circuit 231.

Next, the operation of the controller 230 is as follows:

The control circuit 231 of the controller 230 inputs the reception state measurement results input from the reception state measurement circuits 228-1 and 228-2 to the transmission circuit 213 for transmission to the NodeB 11. To determine whether to use the cell center subcarriers or to use the cell edge subcarriers, the control circuit 231 uses the reception state result to make the determination, and transmits the result to the NodeB 11. When the UE 21-1 uses the cell edge subcarriers, the control circuit 231 references the pattern storage 233 and sends the subcarrier transition pattern assigned to the UE 21-1 to the selector 224 of the receiver 220, thereby controlling the transition of the cell edge subcarriers of the UE 21-1.

Subsequently, a sequence of use subcarrier change in communications between the NodeB 11 and the UE 21-1 will be discussed with FIGS. 18 and 19.

Figure 18:
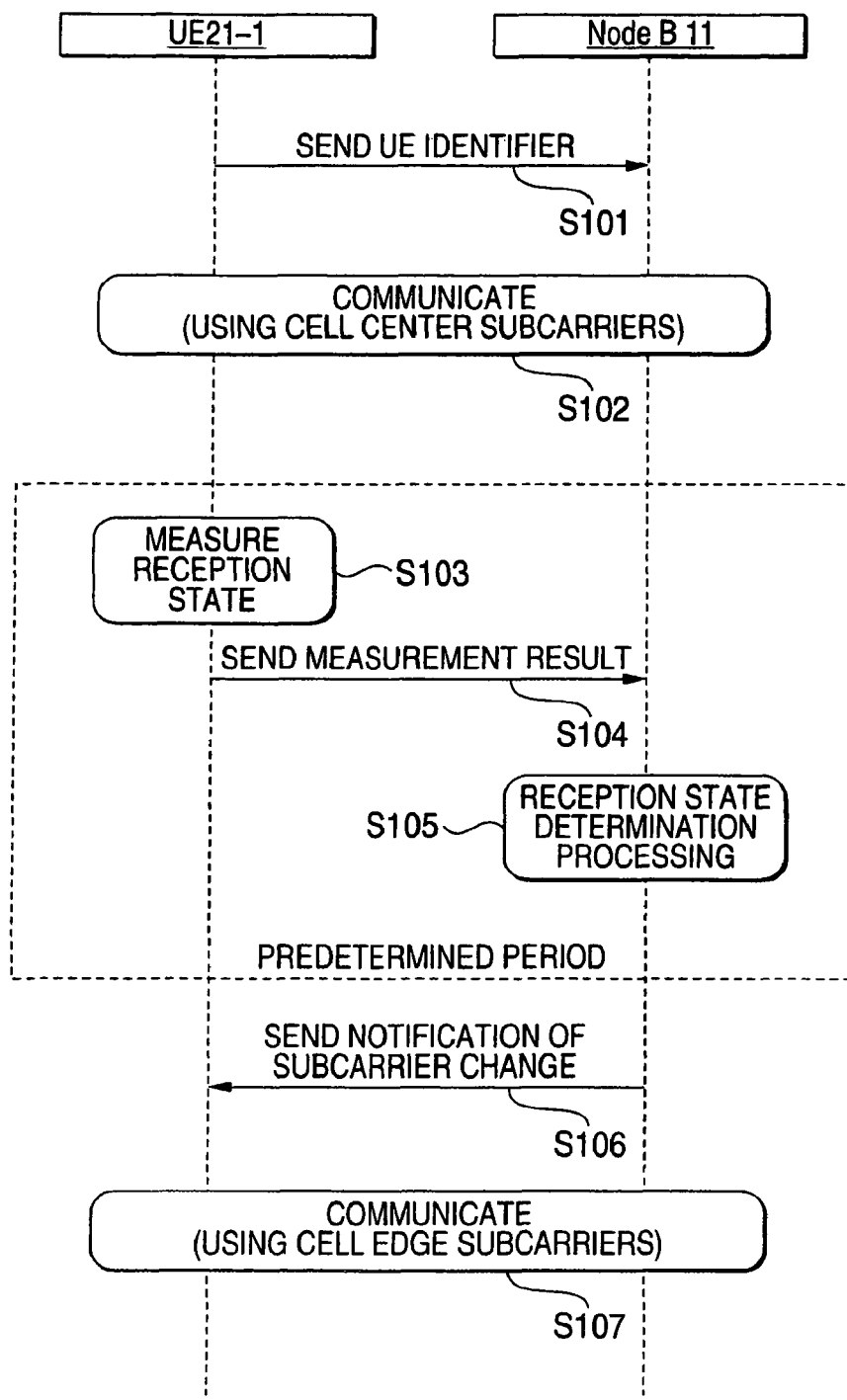
FIG. 18 is a chart to describe a sequence for the first NodeB to determine the reception state of the terminal according to the first embodiment.
Figure 19:
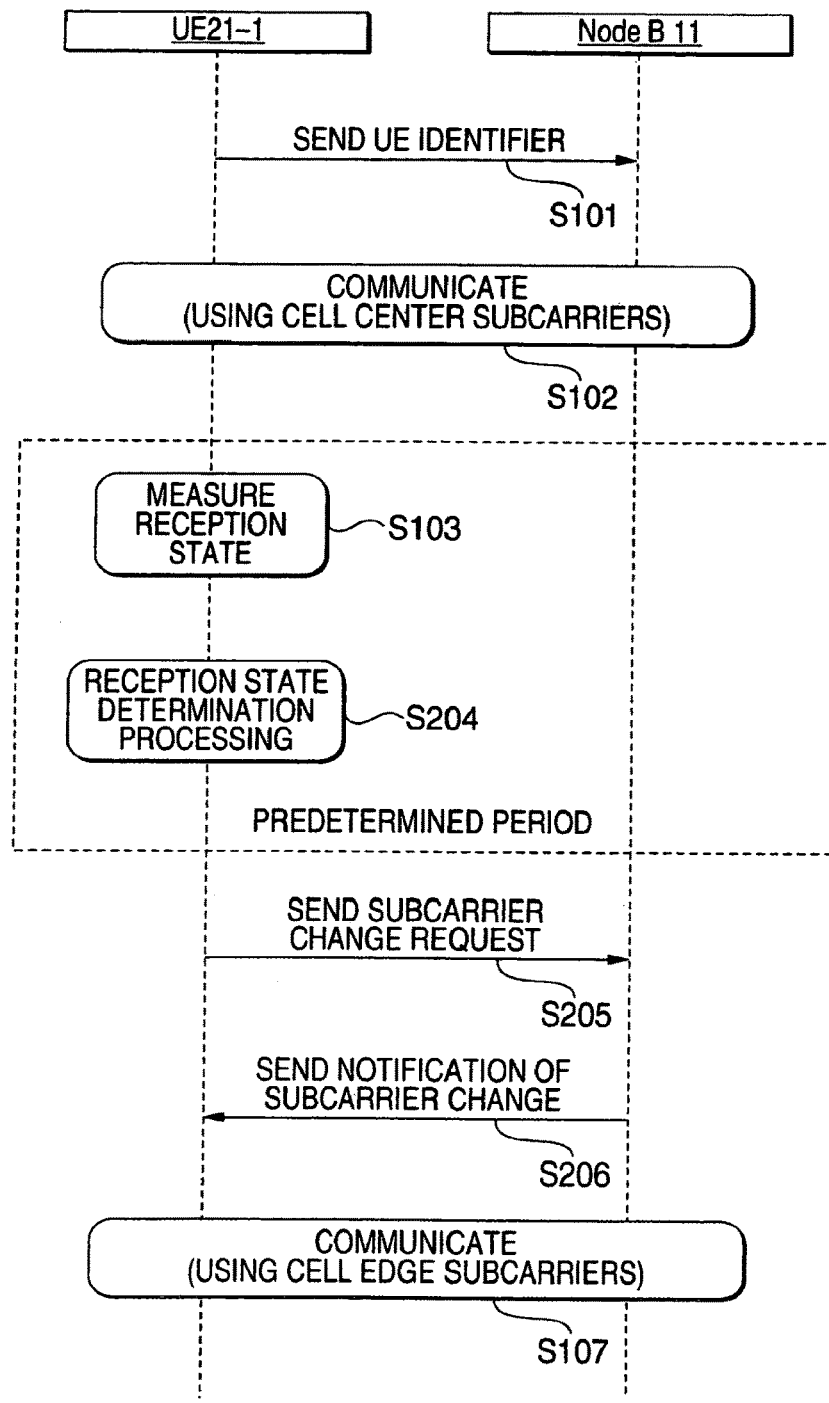
FIG. 19 is a chart to describe a sequence for the terminal to determine the reception state of the terminal according to the first embodiment.

FIG. 18 is a sequence chart to describe the operation in the case of that the NodeB 11 determines the reception state of the UE 21-1. It is assumed that the NodeB 11 and the UE 21-1 conduct communications using the cell center subcarriers until communications are established and the reception state of the UE 21-1 is determined.

First, before starting wireless communications, the UE 21-1 sends the UE identifier to the NodeB 11 (step S101) and communicates with the NodeB 11 using the cell center subcarriers (step S102). Next, during communicating with the NodeB 11, the UE 21-1 measures the reception state of the signal transmitted from the NodeB 11 and the reception state of the signal transmitted from the NodeB 12 not conducting communications after the expiration of a predetermined period (step S103) and sends the measurement result to the NodeB 11 (step S104).

On the other hand, the NodeB 11 receiving the measurement result determines the reception state of the UE 21-1 in reception state determination processing described later and determines whether or not the use subcarriers are to be changed to the cell edge subcarriers (step S105). If it is determined at step S105 that the use subcarriers are to be changed to the cell edge subcarriers, the NodeB 11 sends a notification of change to the cell edge subcarriers and the transition pattern of the cell edge subcarriers to the UE 21-1 (step S106). After the notification, the cell edge subcarriers are used for communications between the NodeB 11 and the UE 21-1 (step S107). Whether or not the cell edge subcarriers are to be changed to the cell center subcarriers is also determined by determining the reception state of the UE 21-1 after the expiration of a predetermined period.

Next, a sequence chart of the operation in the case of that the UE 21-1 determines the reception state of the UE 21-1 will be discussed with FIG. 19. It is assumed that the NodeB 11 and the UE 21-1 conduct communications using the cell center subcarriers until communications are established and the reception state of the UE 21-1 is determined. The sequence shown in FIG. 19 is the same as the sequence shown in FIG. 18 except that the UE 21-1 measures the reception state and requests the NodeB 11 to change the subcarriers from the cell center subcarriers to the cell edge subcarriers in response to the measurement result and therefore steps identical with those previously described with reference to FIG. 18 are denoted by the same step numbers in FIG. 19 and will not be discussed again.

During communicating with the NodeB 11, the UE 21-1 measures the reception state of the signal transmitted from the NodeB 11 and the reception state of the signal transmitted from the NodeB 12 not conducting communications after the expiration of a predetermined period (step S103). The UE 21-1 determines the reception state in reception state determination processing described later and determines whether or not the use subcarriers are to be changed to the cell edge subcarriers (step S204). If it is determined at step S204 that the use subcarriers are to be changed to the cell edge subcarriers, the UE 21-1 requests the NodeB 11 to change the subcarriers to the cell edge subcarriers (step S205). On the other hand, the NodeB 11 receiving the request sends a notification of change to the cell edge subcarriers and the transition pattern of the cell edge subcarriers to the UE 21-1 (step S206).

Next, the reception state determination processing performed by the control circuit 131 of the NodeB 11 will be discussed with FIGS. 20 and 21. The control circuit 231 of the UE 21-1 performs reception state determination processing similar to that of the control circuit 131 of the NodeB 11 and therefore will not be discussed.

Figure 20:
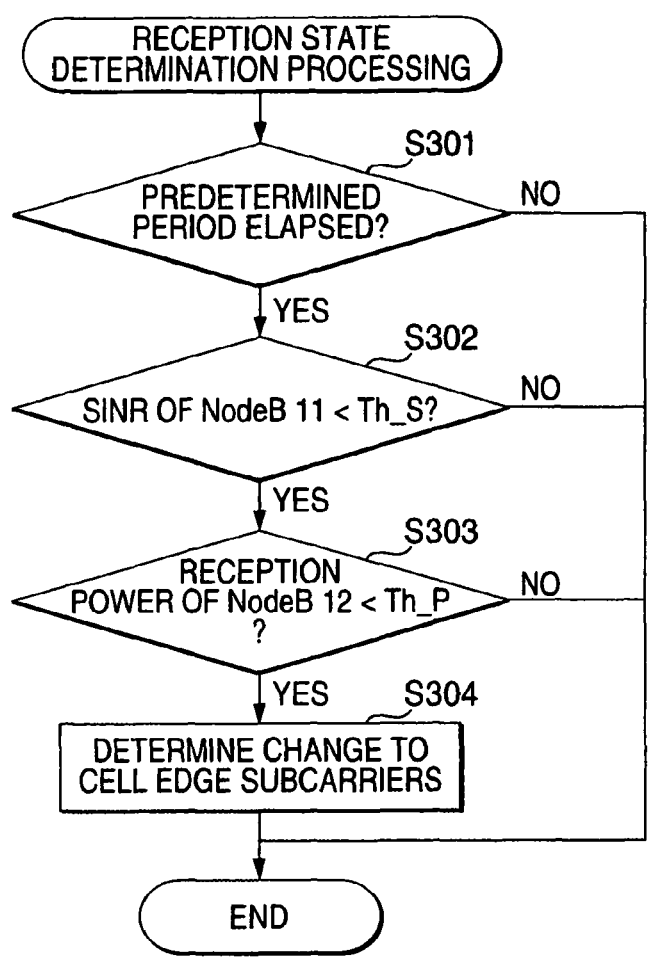
FIG. 20 is a flowchart to describe reception state determination processing according to the first embodiment.
Figure 21:
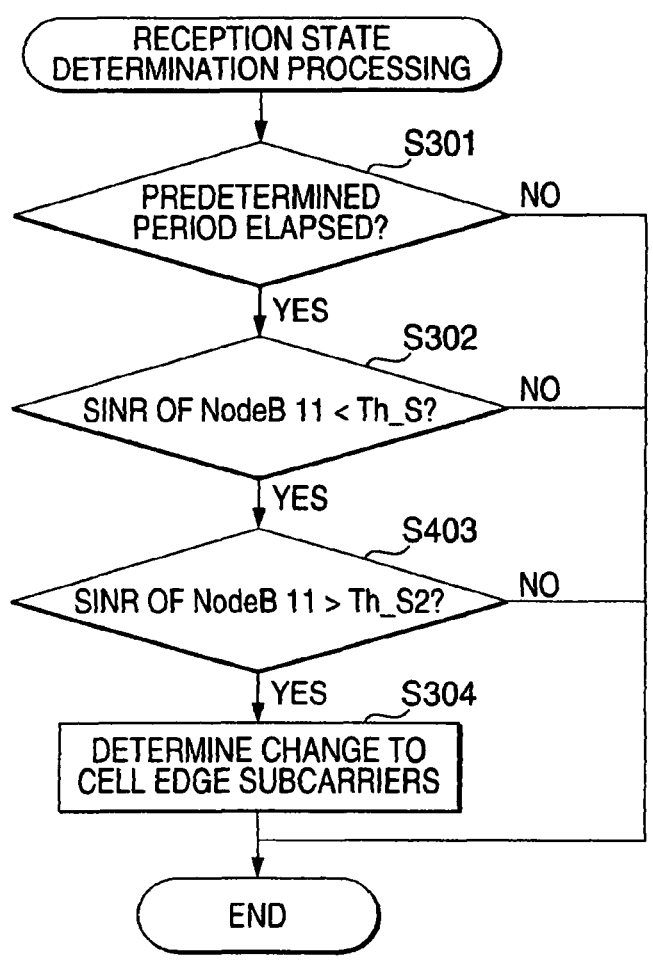
FIG. 21 is a flowchart to describe a modified example of the reception state determination processing according to the first embodiment.

FIG. 20 is a flowchart to describe the reception state determination processing.

The control circuit 131 of the NodeB 11 first determines whether or not a predetermined period has elapsed (step S301). If the predetermined period has not yet elapsed, the reception state determination processing is terminated (NO at step S301). If the predetermined period has elapsed, a comparison is made between the SINR of the pilot symbol transmitted from the NodeB 11 using the cell center subcarriers and a predetermined threshold value Th_S (step S302). The UE 21-1 measures the SINR of the pilot symbol and sends the SINR to the NodeB 11 (see steps S102 and S103 in FIG. 18). If the SINR of the NodeB 11 is the threshold value Th_S or greater as a result of the comparison, it is assumed that the signal from the NodeB 11 sufficiently arrives at the UE 21-1, and the reception state determination processing is terminated without changing the used subcarriers (NO at step S302).

On the other hand, if the SINR of the NodeB 11 is less than the threshold value Th_S, a comparison is made between reception power of the signal transmitted from the NodeB 12 using the cell edge subcarriers and a threshold value Th_P (step S303). The UE 21-1 measures the reception power and sends the reception power to the NodeB 11 (see steps S102 and S103 in FIG. 18). If the reception power is the threshold value Th_P or less as a result of the comparison, it is assumed that the effect of the interference caused by the signal from the NodeB 12 is small, and the reception state determination processing is terminated without changing the used subcarriers (NO at step S303). On the other hand, if the reception power is greater than the threshold value Th_P, it is assumed that the effect of the interference caused by the signal from the NodeB 12 is high, and the subcarriers used for communications with the UE 21-1 are changed from the cell center subcarriers to the cell edge subcarriers (step S304).

Modified Example of Reception State Determination Processing

Next, a modified example of the reception state determination processing performed by the control circuit 131 of the NodeB 11 will be discussed with FIG. 21. The flowchart of FIG. 21 is the same as the flowchart of FIG. 20 except that a comparison is made between the SINR of the signal transmitted from the NodeB 11 using the cell edge subcarriers and a threshold value Th_S2 rather than a comparison is made between reception power of the signal transmitted from the NodeB 12 and the threshold value Th_P (see step S303 in FIG. 20) and therefore steps identical with those previously described with reference to FIG. 20 are denoted by the same step numbers in FIG. 21 and will not be discussed again.

If the SINR of the NodeB 11 is less than the threshold value Th_S as a result of the comparison made at step S302, the control circuit 131 makes a comparison between the SINR of the signal transmitted from the NodeB 11 using the cell edge subcarriers and a threshold value Th_S2 (step S403), wherein the UE 21-1 measures the SINR and sends the SINR to the NodeB 11 (see steps S102 and S103 in FIG. 18).

If the SINR is the threshold value Th_S2 or less as a result of the comparison, it is assumed that the effect of the interference caused by the signal from the NodeB 12 is small, and the reception state determination processing is terminated without changing the used subcarriers (NO at step S403). On the other hand, if the SINR is greater than the threshold value Th_S2, it is assumed that the effect of the interference caused by the signal from the NodeB 12 is high, and the subcarriers used for communications with the UE 21-1 are changed from the cell center subcarriers to the cell edge subcarriers (step S304).

As described above, according to the first embodiment, the subcarriers used for communications of the NodeB 11 are divided into the two types of cell center subcarriers and cell edge subcarriers and the NodeB 11 uses either of the types of subcarrier depending on the location of the UE with which the NodeB 11 communicates, so that the NodeB 11 can communicate with the UE 21-1 existing in the cell center and the UE 21-2 existing in the cell edge at the same time and the throughput in the communication area A1 can be ensured. The transition pattern of the cell edge subcarriers to be used is different between the NodeB 11 and the NodeB 12, so that the probability that the NodeB 11 and the NodeB 12 may use the same carrier at the same time lessens and the interference between the adjacent communication areas A1 and A2 can be suppressed. Further, the NodeB 11, NodeB 12 uses the cell edge subcarriers and the cell center subcarriers of the same frequency band at the same time to conduct communications, whereby the number of unused subcarriers can be reduced and lowering the whole throughput of the system can be minimized.

Second Embodiment

Next, a wireless communication system according to a second embodiment of the invention will be discussed with FIGS. 22A to 23B. The configuration and the operation of the wireless communication system according to the second embodiment are the same as those of the wireless communication system according to the first embodiment except the wireless frame format shown in FIGS. 6A and 6B and therefore parts identical with those previously described are denoted by the same reference numerals and will not be discussed again.

Figure 22A:
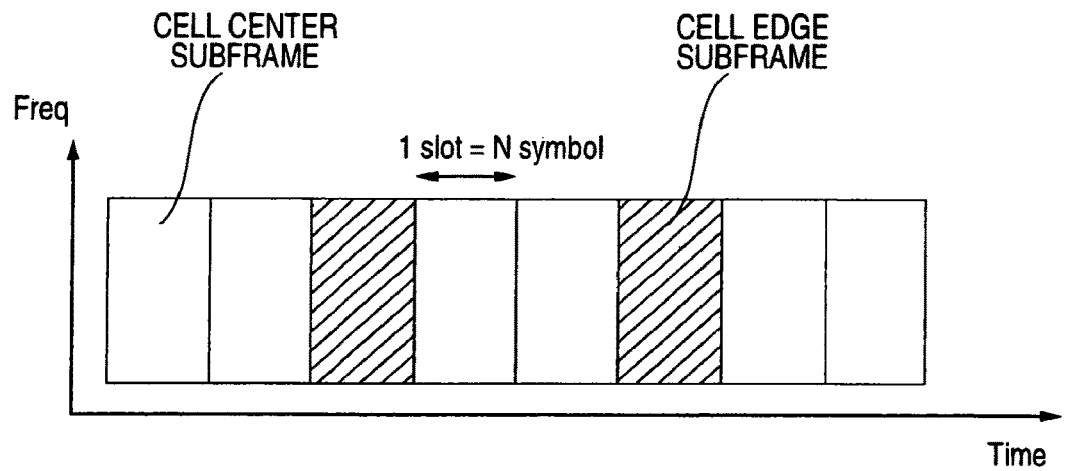
FIGS. 22A and 22B are drawings to show a wireless frame format according to a second embodiment of the invention.
Figure 22B:
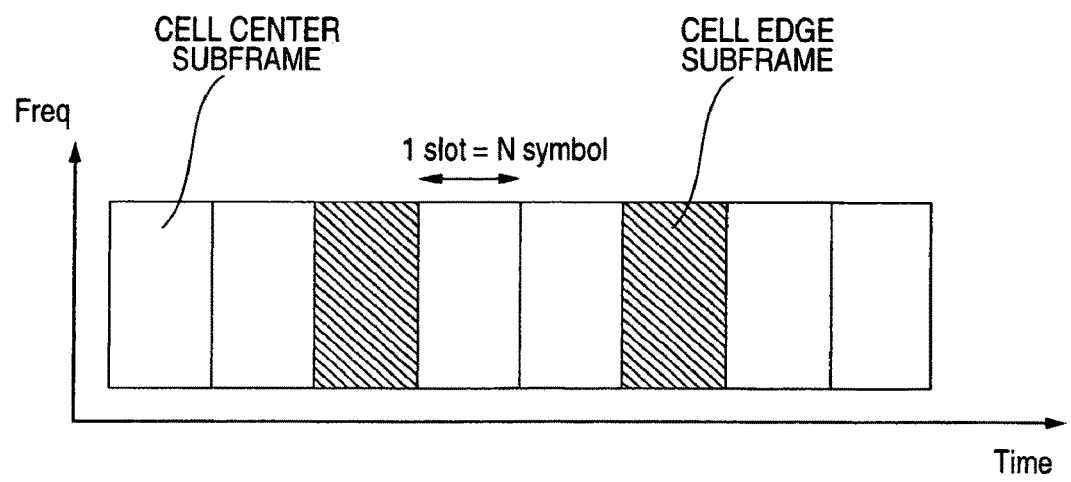

In the embodiment, the whole subframe is used as a cell center subframe or a cell edge subframe rather than subframes are divided into the two types of cell center subcarriers and cell edge subcarriers. FIG. 22A shows the wireless frame format applied for NodeB 11, and FIG. 22B shows the wireless frame format applied for NodeB 12. The NodeB 11 and NodeB 12 perform service using the same frequency band. FIGS. 22A and 22B display the wireless frame formats of the same frequencies.

In the wireless frame format shown in FIGS. 6A and 6B, the NodeB 11 transmits a signal using both of the cell center subcarriers and the cell edge subcarriers at the same time; while, in the wireless frame format shown in FIGS. 22A and 22B, a signal is transmitted using either of the cell center subcarriers and the cell edge subcarriers. In this case, all subcarriers are used as the cell center subcarriers or the cell edge subcarriers.

In the example shown in FIG. 22A, the NodeB 11 first transmits a signal using the cell center subcarriers in slots 1 and 2. Next, the NodeB 11 transmits a signal using the cell edge subcarriers in slot 3. That is, the NodeB 11 transmits a signal using the cell edge subcarriers every 3-slot period.

On the other hand, the NodeB 12 also transmits a signal using the cell edge subcarriers every 3-slot period like the NodeB 11, as shown in FIG. 22B. Therefore, NodeB 11 and NodeB 12 transmit a signal using the cell center subcarriers or the cell edge subcarriers in the same slot. Here, the example wherein the NodeB 11, NodeB 12 uses the cell edge subcarriers every 3-slot period is shown, but may use the cell edge subcarriers every L-slot period.

Figure 23A:
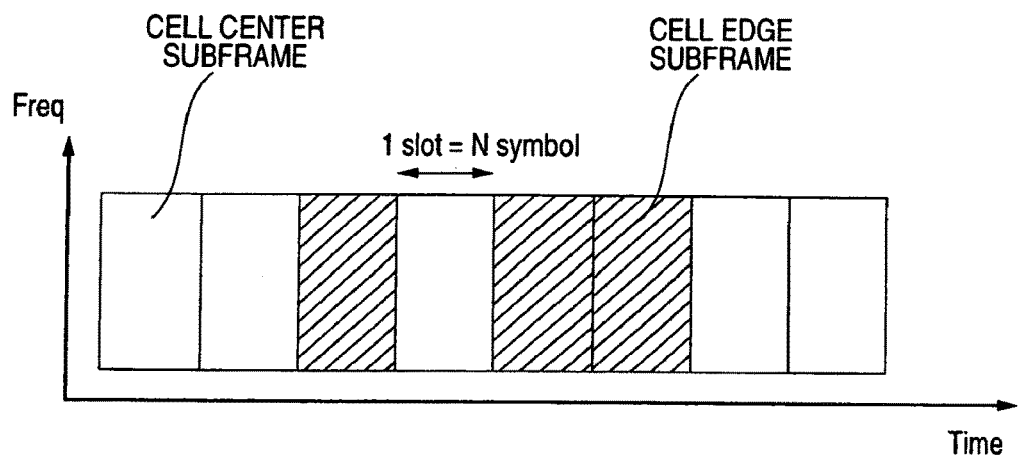
FIGS. 23A and 23B are drawings to show a modified example of the wireless frame format according to the second embodiment.

Next, a modified example of the wireless frame format will be discussed with FIGS. 23A and 23B. FIG. 23A shows the wireless frame format applied for NodeB 11, and FIG. 23B shows the wireless frame format applied for NodeB 12.

Figure 23B:
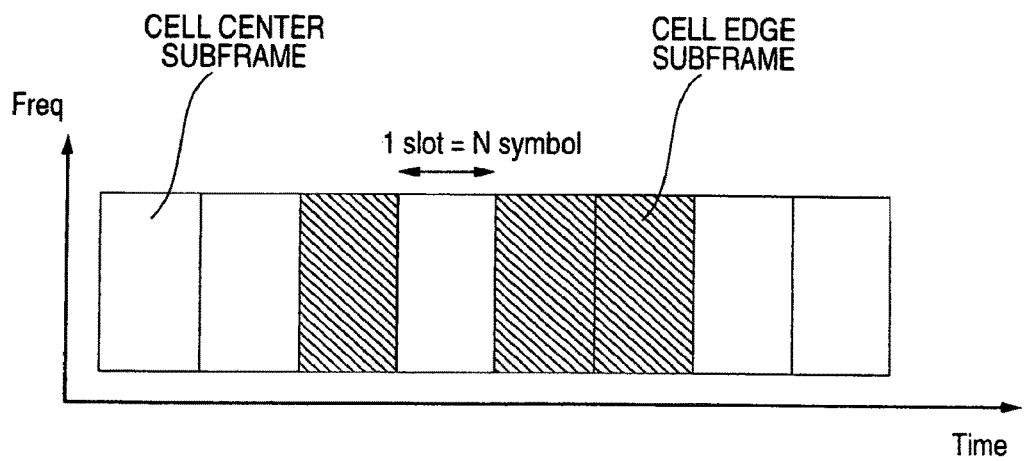

In the wireless frame format shown in FIGS. 23A and 23B, the NodeB 11, NodeB 12 uses the cell edge subcarriers for transmission in any desired slot rather than uses the cell edge subcarriers for transmission every 3-slot period. The NodeB 11, NodeB 12 uses the cell edge subcarriers or the cell center subcarriers at the same time and does not use the two types of subcarriers at the same time.

As described above, according to the second embodiment, similar advantages to those of the first embodiment can be provided and in addition, the NodeB 11, NodeB 12 can use all subcarriers that can be used for signal transmission as the cell center subcarriers or the cell edge subcarriers, so that the wireless communication performance can be improved by the frequency diversity effect.

Third Embodiment

Next, a wireless communication system according to a third embodiment of the invention will be discussed with FIGS. 24A and 24B. The configuration and the operation of the wireless communication system according to the third embodiment are the same as those of the wireless communication system according to the first embodiment except the wireless frame format shown in FIGS. 6A and 6B and therefore parts identical with those previously described are denoted by the same reference numerals and will not be discussed again.

Figure 24A:
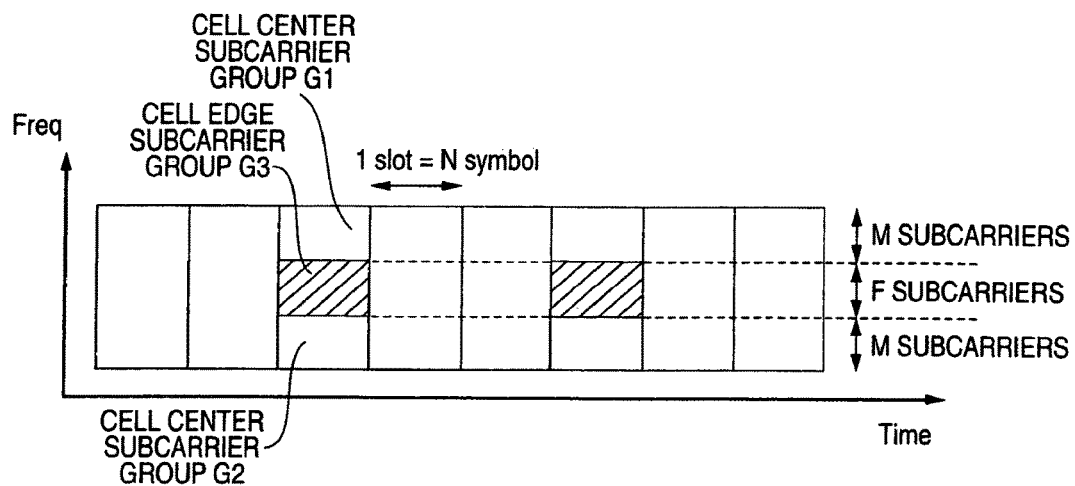
FIGS. 24A and 24B are drawings to show a wireless frame format according to a third embodiment of the invention.
Figure 24B:
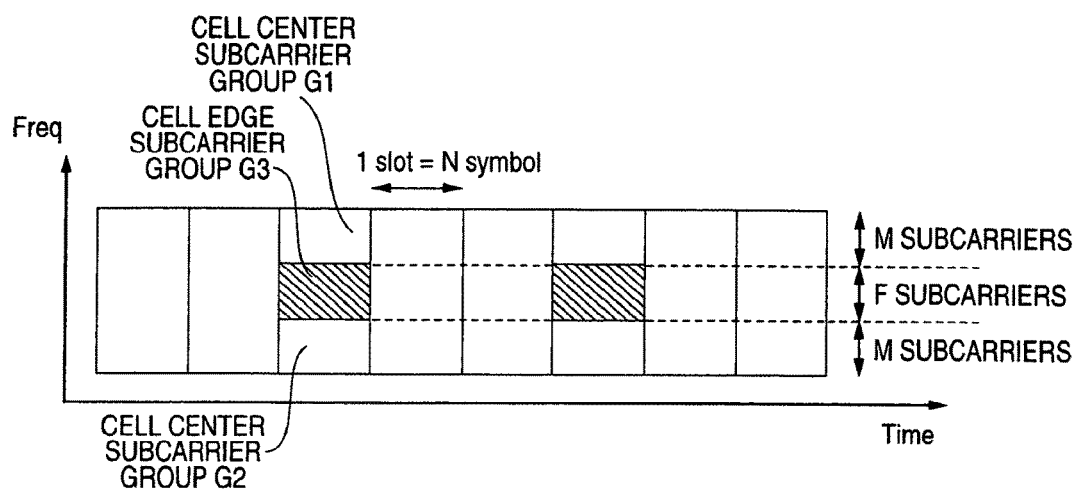

FIG. 24A shows the wireless frame format applied for NodeB 11, and FIG. 24B shows the wireless frame format applied for NodeB 12.

The NodeB 11 has slot S1 in which all subcarriers are used as cell center subcarriers and slot S2 wherein subcarriers are divided into cell center subcarrier groups G1 and G2 and a cell edge subcarrier group G3 for use, as shown in FIG. 24A. The configuration of the slot S2 is the same as the slot configuration of the wireless frame shown in FIGS. 7 to 9 and therefore will not be discussed again.

The NodeB 11 transmits a signal in slot S2 every 3-slot period and transmits a signal in slot S1. The wireless frame format applied for the NodeB 12 shown in FIG. 24B is the same as the wireless frame format shown in FIG. 24A and therefore will not be discussed again. Here, an example wherein the NodeB 11, NodeB 12 uses the slot S2 every 3-slot period is shown, but may use the slot S2 every L-slot period, and slot S2 may be inserted between consecutive slots S1 as desired.

As described above, according to the third embodiment, similar advantages to those of the first embodiment can be provided and in addition, each of the slots S1 and S2 has the cell center subcarriers and thus the NodeB 11, NodeB 12 can use any slot to transmit a signal to UE existing in the cell center. Generally, the cell center area is wider than the cell edge area and the number of UEs existing in the cell center is larger than the number of UEs existing in the cell edge, so that the system throughput can be improved by transmitting a signal to UE existing in the cell center using any slot.

It is to be understood that the invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiment. Further, the components in different embodiments may be used appropriately in combination.

What is claimed is:

1. A wireless communication apparatus communicable with a first base station and a second base station, the wireless communication apparatus comprising:
   processing circuitry configured to:
      generate modulated signals; and
      map the modulated signals of a first slot on first subcarriers included in a first subcarrier group;
      map the modulated signals of a second slot on second subcarriers included in a second subcarrier group,
      wherein a frequency band of the second subcarriers overlaps with a frequency band of the first subcarriers, the second slot is different from the first slot, and the frequency band of the first subcarriers is different from the frequency band of the second subcarriers, and
      wherein a combination of the first subcarriers on which the modulated signals of the first slot are mapped and the second subcarriers on which the modulated signals of the second slot are mapped is different based on whether the wireless communication apparatus is communicating, using the first subcarriers and the second subcarriers, with the first base station or the second base station; and
   transmitting circuitry configured to:
      transmit the modulated signals mapped on the first subcarriers and the second subcarriers.

2. The wireless communication apparatus according to claim 1, wherein the processing circuitry is further configured to:
   generate pilot signals; and
   map the pilot signals on a plurality of subcarriers in a frequency domain in at least one symbol in a time domain of each slot,
   wherein the modulated signals are not mapped on the plurality of subcarriers mapped with the pilot signals.

3. The wireless communication apparatus according to claim 1, wherein frequencies of the first subcarrier group are not a highest frequency or a lowest frequency of frequencies of subcarrier groups.

4. The wireless communication apparatus according to claim 1, wherein subcarriers in a frequency domain in the first subcarrier group are used for communication between the first base station and the wireless communication apparatus in a case that the wireless communication apparatus is at a cell edge of the first base station.

5. The wireless communication apparatus according to claim 1, further comprising:
an antenna configured to transmit the modulated signals mapped by the processing circuitry.

6. The wireless communication apparatus according to claim 1, further comprising:
a higher-layer processor configured to generate data for transmission; and
a higher-layer interface configured to receive the generated data, wherein the processing circuitry is configured to generate the modulated signals based on the generated data.

7. The wireless communication apparatus according to claim 1, wherein the transmitting circuitry is further configured to perform one or more of:
D/A conversion,
up conversion,
band limiting, or
power amplification.

8. The wireless communication apparatus according to claim 1, wherein a modulated signal of the modulated signals is mapped to a plurality of symbols on at least two subcarriers of a plurality of subcarriers.

9. The wireless communication apparatus according to claim 8, wherein no two consecutive symbols of the plurality of symbols are mapped to a same subcarrier of the plurality of subcarriers.

10. The wireless communication apparatus according to claim 8, wherein the modulated signals are mapped to the plurality of symbols on the at least two subcarriers using a transition pattern.

11. The wireless communication apparatus according to claim 1, wherein the processing circuitry is further configured to:
in a case that the wireless communication apparatus communicates with a third base station different from the first base station and the second base station, determine, based on a predetermined rule corresponding to the third base station, to use a transition pattern corresponding to the third base station.

12. A wireless communication method for a wireless communication apparatus communicable with a first base station and a second base station, the method comprising:
generating, by processing circuitry of the wireless communication apparatus, modulated signals;
mapping, by the processing circuitry of the wireless communication apparatus, the modulated signals of a first slot on first subcarriers included in a first subcarrier group;
mapping, by the processing circuitry of the wireless communication apparatus, the modulated signals of a second slot on second subcarriers included in a second subcarrier group,
wherein a frequency band of the second subcarriers overlaps with a frequency band of the first subcarriers, the second slot is different from the first slot, and the frequency band of the first subcarriers is different from the frequency band of the second subcarriers, and
wherein a combination of the first subcarriers on which the modulated signals of the first slot are mapped and the second subcarriers on which the modulated signals of the second slot are mapped is different based on whether the wireless communication apparatus is communicating, using the first subcarriers and the second subcarriers, with the first base station or the second base station; and
transmitting, by transmitting circuitry of the wireless communication apparatus, the modulated signals mapped on the first subcarriers and the second subcarriers.

13. The wireless communication method according to claim 12, further comprising:
generating pilot signals; and
mapping the pilot signals on a plurality of subcarriers in a frequency domain in at least one symbol in a time domain of each slot,
wherein the modulated signals are not mapped on the plurality of subcarriers mapped with the pilot signals.

14. The wireless communication method according to claim 12, wherein frequencies of the first subcarrier group are not a highest frequency or a lowest frequency of frequencies of subcarrier groups.

15. The wireless communication method according to claim 12, wherein subcarriers in a frequency domain in the first subcarrier group are used for communication between the first base station and the wireless communication apparatus in a case that the wireless communication apparatus is at a cell edge of the first base station.

16. The wireless communication method according to claim 12, further comprising:
transmitting the mapped modulated signals using an antenna.

17. The wireless communication method according to claim 12, further comprising:
generating, in a higher layer, data for transmission, wherein the modulated signals are generated based on the data for transmission.

18. The wireless communication method according to claim 12, further comprising:
D/A converting the modulated signal;
up-converting the modulated signal;
band limiting the modulated signal; and
power amplifying the modulated signal.

19. The wireless communication method according to claim 12, wherein a modulated signal of the modulated signals is mapped to a plurality of symbols on at least two subcarriers of a plurality of subcarriers.

* * * * *